July 15, 1969 J. M. GLASSON 3,456,239

BLOCK SYNCHRONIZATION CIRCUIT FOR AN ERROR DETECTION AND CORRECTION SYSTEM

Filed Dec. 10, 1965 6 Sheets-Sheet 1

INVENTOR
JERRY M. GLASSON
BY R. C. Terry
ATTORNEY

July 15, 1969 J. M. GLASSON 3,456,239

BLOCK SYNCHRONIZATION CIRCUIT FOR AN ERROR DETECTION AND CORRECTION SYSTEM

Filed Dec. 10, 1965 6 Sheets-Sheet 5

United States Patent Office
3,456,239
Patented July 15, 1969

3,456,239
BLOCK SYNCHRONIZATION CIRCUIT FOR AN ERROR DETECTION AND CORRECTION SYSTEM

Jerry M. Glasson, Skokie, Ill., assignor to Teletype Corporation, Skokie, Ill., a corporation of Delaware Filed Dec. 10, 1965, Ser. No. 512,854
Int. Cl. G08b 29/00; G08c 25/00
U.S. Cl. 340—146.1 9 Claims

ABSTRACT OF THE DISCLOSURE

A system for maintaining block synchronism in an error-detection-and-correction system using full-duplex transmission, wherein transmission of one block of data is followed immediately by transmission of the succeeding block of data without waiting for confirmation of accurate receipt of the first block. Each block is assigned an "odd" or "even" number designation by both the transmitter and the receiver; and near the end of transmission of the succeeding block, the receiver sends, over the reverse channel, one of four signals—accurate, odd or even; or errored, odd or even.

This invention relates to error detection and correction systems in which information is transmitted in blocks of discrete lengths, and more particularly to a system for maintaining block synchronization in such error detection and correction system.

In the transmission of messages or data by means of telegraph facilities, it often becomes necessary to insure that the messages or data transmitted are recorded free of any errors. This becomes especially important in the transmission of numerical data since errors which occur in any given data character, encoded in binary permutation code, merely transform the desired data character into another data character. When this occurs, there usually is no way for the recipient of the data to know that such a transposition has taken place. As a consequence, it has become common in the data communication art to transmit information in the form of blocks of characters with a parity check character or characters being transmitted at the end of each block. This parity check character generally is a character generated by taking a horizontal or spiral parity check over all of the information bits transmitted in the block. At the receiver a similar parity check character is generated based on a parity check made over the data as received at the receiver. The parity check character transmitted from the transmitter and the parity check character generated at the receiver are compared at the receiver; and if they agree, the block transmitted is assumed to be correct and is recorded. If the comparison between the parity check characters indicates disagreement, the receiving station notifies the transmitting station that the block which preceded the parity check character was in error; and the transmitter retransmits this block from storage. Thus, in the event that error-free transmission is taking place, transmission in continuous with the exception of the insertion of the parity check characters. Very little line time is wasted in the error checking operation since the parity check character provides an error check for a large number of information characters (ordinarily 80 information characters are chosen to constitute a block on which the parity check is made).

Although the basic idea of providing block transmission, as outlined above, in a full duplex system allows high speed transmission of information, as transmission speeds increase to the order of 1,000 or 2,000 words per minute, extra provisions must be taken in order to assure that block synchronization between the transmitting station and the receiving station is maintained. This is necessary especially in full duplex operation in which transmission is continuous, that is, in which the transmitter begins transmitting a second block immediately after transmitting the parity check character for the previous block without waiting for a signal from the receiver indicating whether or not the previous block was errored or error free. As a consequence, during the second block the transmitter receivers a signal from the receiver indicating the status of the first block as received. If this signal indicates that a block was in error, it is possible under certain conditions of operation for the transmitting station to repeat one block when a different proceding block actually was errored.

As a result, it has become necessary in high speed data transmision systems in which transmission takes place at speeds of 1,000 words per minute or over to have some means of identifying the particular block or blocks which are in error; so that retransmission of only the proper blocks is assured.

Accordingly, it is an object of this invention to provide a system for maintaining block synchronization in a high speed error detection and correction system.

It is a futher object of this invention to provide a block synchronization system for a high speed error detection and correction system in which an odd-even block counter is provided at both the transmitter and receiver for identifying the blocks transmitted and received.

It is a further object of this invention to provide a block synchronization circuit for an error detection and correction system in which the receiver indicates to the transmitter at the end of each block whether or not the block was an odd or an even block and whether or not that block was errored or error free.

It is a still further object of this invention in a block synchronization system for an error detection and correction system having an odd-even block counter at the transmitting and receiving stations, to compare the block number transmitted with the block number received in order to insure that the transmitting and receiving stations are in synchronization.

It is an additional object of this invention to maintain block synchronization between a transmitting and a receiving station in a full duplex data transmission EDC system under all conditions of operation including long or short noise bursts on either the send or receive channels.

These and other objects are accomplished in accordance with a preferred embodiment of the invention in which a transmitting station transmits binary data bits having one of two conditions to a receiving station. A predetermined number of the binary data bits are encoded in permutation code to constitute a character, and a predetermined number of these characters constitute a block of information. A character counter is provided at both the transmitting and receiving stations to count the number of characters transmitted or received, respectively; and after counting a predetermined number of characters equal in number to the length of a block, the character counter causes the transmitting station to transmit a parity check character to the receiving station where it is compared with a parity check character generated at the receiving station. Both of these parity check characters are based on a parity check made over the transmitted and received blocks, respectively. If the transmission was error free, a comparison of the parity check characters at the receiver will indicate agreement between them. If the parity check characters are in disagreement, this is indicative of an error somewhere in the block over which the parity check was made; and retransmission of that block of informatin is required.

Since relatively few errors occur in normal transmission, the system provides for continuous transmission with the exception of the insertion of the parity check character at the end of each block, that is, transmission of the next succeeding block from the transmitting station takes place immediately following transmission of the parity check character. The transmitting station does not wait for notification from the receiving station that a transmitted block was properly received. In order to accomplish this type of operation, a memory is provided at both the transmitting and receiving stations with the memory at the transmitting station having capacity to store two blocks of information and with the memory at the receiving station being a buffer memory having a one block capacity. The transmitted information supplied to the receiver also is supplied simultaneously to the memory at the transmitter where the last two blocks transmitted are stored.

At the receiver, the received information is supplied to the buffer memory which stores the entire block. If the parity check at the receiving station indicates agreement between the parity check characters, the information stored in the receiving station memory is supplied to a recording apparatus simultaneously while the next block of information is stored in the buffer memory.

Provision is made for continuously appraising the transmitting station of the condition of the received information; and provision is made for maintaining block synchronization between the transmitting and receiving stations. This is accomplished by providing an odd-even block counter at both stations. At the receiving station, an answer back signal generator is energized at the end of the receipt of each block; and this signal generator transmits one of four discrete signals to the transmitting station. These signals indicate whether the block was received error free or errored and whether the block is an odd or even block. At the transmitting station this signal is sampled near the end of transmission of each block. If the signal indicates that the previous block was received error free and if the odd-even block number is not the same as the odd-even block number at the transmitting station, the transmitting station transmits the normal parity check character for the block being transmitted at the time the sample was made. The next succeeding block of information then is transmitted following the parity check character. If the signal from the receiving station indicates that the previous block was errored and if the odd-even block number from the receiving station differs from the odd-even number at the transmitting station at the time of the sample, the transmitting station forces an error in the parity check character of the block being transmitted at the time the sample was made, and immediately retransmits the preceding block and this block from the memory.

In the event that no response is detected at the time the sample of the receiving station response is made, the transmitting station forces an error in the parity check character of the block being transmitted and waits for a response from the receiving station. This response must indicate an error since the transmitting station forced an error in the block last transmitted. However, until a response is received from the receiving station, the transmitting station is unaware of whether or not the block for which the response was missing was errored or error free. When the response does come from the receiving station, the odd-even block number is compared with the odd-even block number at the transmitting station; and if the block numbers are not the same, the transmitting station transmits the last two blocks from memory and normal operation resumes. If the block numbers are the same, the transmitting station merely retransmits the last block from the memory. Under all other conditions whenever the block number of the response from the receiving station is identical to the block number at the transmitting station, the receiving and transmitting stations are out of synchronization causing the transmitter to stop and alarm. In a like manner, the next response from the receiver following a sample which detected no response must indicate an error since the transmitter forces an error in one of the blocks transmitted to the receiving station. Thus, any block error free response detected under such circumstances indicates that something is wrong and the transmitter is stopped and an alarm condition is indicated.

Other features and objects of this invention will become apparent to those skilled in the art from the following detailed description of the system considered in conjunction with the accompanying drawings in which:

FIG. 2 illustrates the manner in which

FIG. 3 is a circuit diagram of a receiving station in accordance with a preferred embodiment of the invention; and FIGS. 4 to 7 are circuit diagrams of a transmitting station in accordance with a preferred embodiment of the invention.

GENERAL DESCRIPTION

Figure 1:
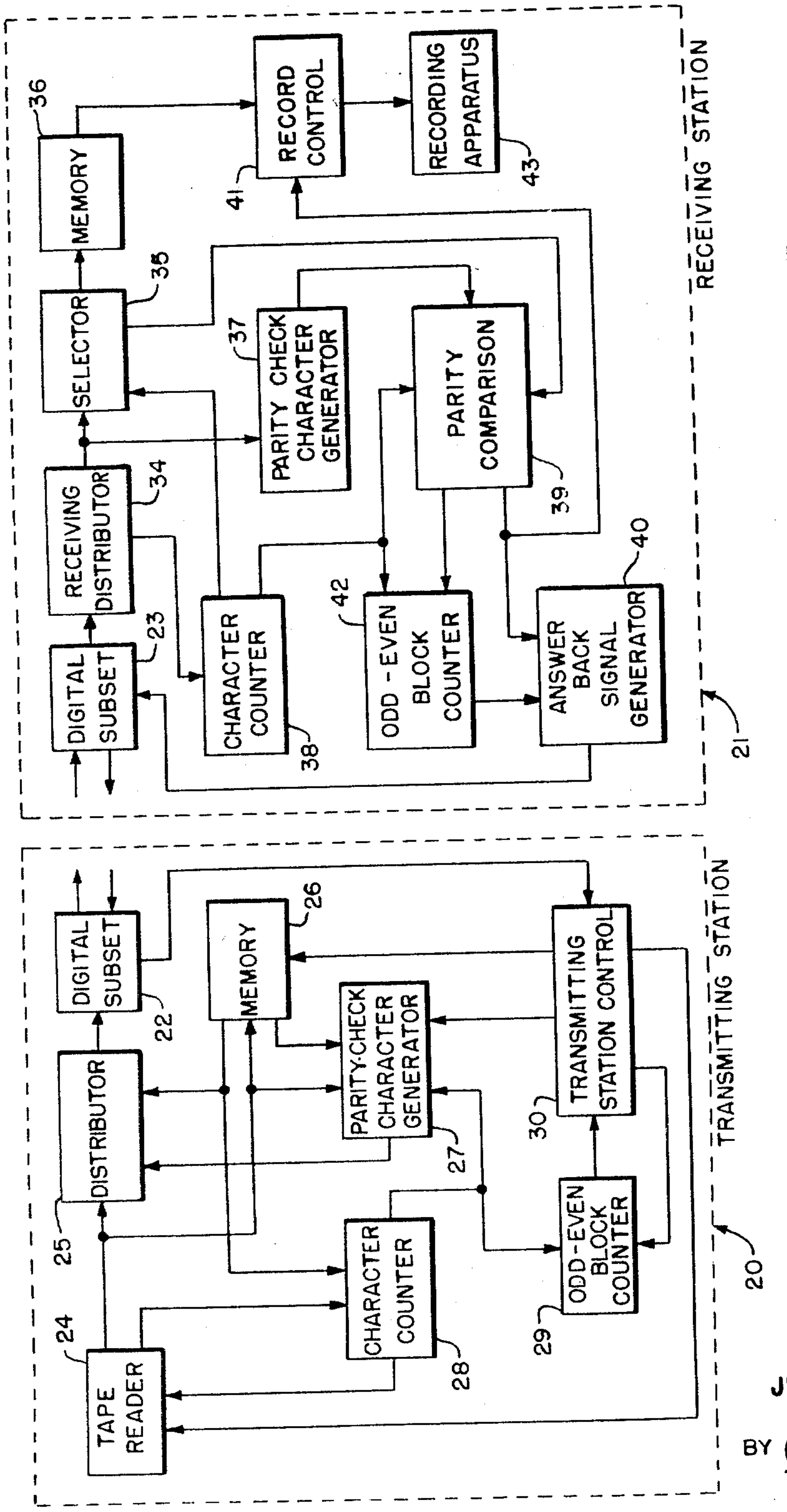
FIG. 1 is a block diagram of the system according to a preferred embodiment of the invention.

Referring now to FIG. 1 there is shown a block diagram of a preferred embodiment of a block synchronization system for an error detection and correction system. A transmitting station is generally indicated at 20 and a receiving station is indicated at 21. The transmitting and receiving stations 20 and 21 may be interconnected through conventional telephone digital subsets 22 and 23 which transmit in two directions simultaneously, neither direction affecting the other.

When it is desired to initiate transmission from the transmitting station 20 to the receiving station 21, the operator at the sending station makes a telephone connection through the digital subset 22 at the transmitting station to the digital subset 23 at the receiving station. After a telephone connection has been made and following a predetermined time interval, the transmitting station then may initiate the transmission of data to the receiving station. First, bit and character synchronization of the transmitting and receiving stations must be accomplished. In the preferred embodiment of the invention, this is done in the manner shown in the copending application, Ser. No. 506,100, filed in the name of J. M. Glasson on Nov. 2, 1965, and assigned to the same assignee as the present invention. Following character synchronization, a "start of message" code may be used to reset and start the block synchronization logic at both the transmitting and receiving stations. In the detailed description of FIGS. 3 to 7, this "start of message" code is represented by a logic reset pulse. A high speed tape reader 24, which may be of the type disclosed in the copending patent application, Ser. No. 358,285, filed on Apr. 8, 1964 in the name of J. L. De Boo and now Patent No. 3,392,237 and assigned to the same assignee as the present invention, then reads a tape containing the information to be transmitted and supplies the information to a transmitting distributor 25 which may be of any suitable type. The output of the transmitting distributor 25 is supplied to the digital subset 22 which in turn supplies the information to the receiving station digital subset 23. The output of the reader 24 also is supplied simultaneously to a memory unit 26 which has a capacity to store at least two blocks of information. The memory unit 26 may be of any suitable type including paper tape or magnetic tape storage with associated recording and reading devices, but preferably is a random access ferrite core memory of the type disclosed in Bell System Practices, Section 592–952–105, issue 2 of June 1965. The output of the transmitter reader 24 also is supplied simultaneously to a parity check character generator 27 which may be of the type disclosed in the copending patent application Ser. No. 162,649, filed on Dec. 28, 1961 in the names of S. Silberg and R. D. Slayton and now Patent No. 3,242,461 and assigned to the same assignee as the present invention. In order to ascertain the block length and consequently the time at which the parity check character should be transmitted, a character counter 28 counts each character transmitted by the tape reader 24. When a predetermined count corresponding to the number of characters in a block is reached by the character counter 28, the character counter supplies a signal to the tape reader 24 causing it to stop reading and simultaneously causes the parity check generator 27 to supply the parity check character to the distributor 25. The parity check character then is transmitted to the receiving station. This sequence of operation may be carried out in the manner shown in the above-identified Silberg-Slayton application and forms no part of the present invention.

At the same time, an odd-even block counter 29 is pulsed causing it to change its count. Prior to the beginning of transmission the odd-even block counter 29 is set to a count indicating the odd state since the first block transmitted is an odd numbered block. Then at the end of the first block, the block counter 29 is triggered to its even state since the next block to be transmitted, of course, will be an even numbered block.

At the receiving station the transmitted information is received by the digital subset 23 and is supplied to a conventional receiving distributor 34. The output of the receiving distributor 34 passes through a selector 35 which in turn supplies the received block of information to a buffer memory 36. The buffer memory 36 must be capable of storing one block of received information and may be a multiple level shift register or it may be the same type of memory as is used at the transmitting station. The output of the receiving distributor 34 also is supplied simultaneously to a parity check generator 37 which may be of the same type as the parity check generator 27 at the transmitting station. A character counter 38, similar to the character counter 28 used at the transmitting station, counts the received characters; and when a number of characters equal to the number of information characters in a block have been received, the character counter 38 supplies a signal to the selector 35 which causes the next character received to be supplied to a parity comparison circuit 39 rather than to the memory 36 since this next character is the transmitted parity check character. At this time, the output of the parity check generator 37 is compared with the received parity check character supplied to the parity comparison circuit 39 by the selector 35. This comparison may be carried out in the manner shown in the afore-mentioned Silberg-Slayton application.

The output of the parity comparison circuit 39 then is supplied to an answer-back signal generator 40 and a record control gate 41. This output from the parity comparison circuit 39 indicates whether or not the received block was errored or error free. The answer-back signal generator 40 also is supplied with a signal input from an odd-even block counter 42 which is the same as the odd-even block counter 29 utilized in the transmitting station. At the beginning of each blank the odd-even block counter 42 is supplied with a trigger pulse. At the beginning of receipt of the first block of information, the block counter 42 is set to its odd condition indicating that an odd numbered block is being received. The output of the odd-even block counter 42 then causes the answer-back signal generator 40 to indicate whether or not the received block was an odd or an even numbered block. As a consequence, the output of the answer-back signal generator 40 is one of four discrete signals, namely, odd block received error-free (BOK "0"), odd block received errored (BNOK "0"), even block received error-free (BOK "1"), even block received errored (BNOK "1").

If the received block of information was error-free, the output of the parity comparison circuit 39 opens the record control gate 41 allowing the information to be transferred from the memory 36 to a suitable recording apparatus 42 simultaneously while the next block of information from the transmitter is being stored in the memory 36. If the received block was errored, the record control gate 41 is closed and prevents information being supplied out of the memory 36 from reaching the recording apparatus 43. Thus, it is seen that the recording apparatus 43 is allowed to record only valid error-free information and that no errored information ever reaches the recording apparatus 43.

During transmission of the next subsequent block by the transmitting station 20, the return signal from the answer-back signal generator 40 is supplied to the digital subset 23 which transmits it to the digital subset 22 at the transmitting station. This signal then is supplied from the digital subset 22 to a transmitting station control 30 which controls the operation of the transmitting station 20 in accordance with the return signals received from the receiving station. As stated previously, the odd-even block counter 29 is triggered at the beginning of transmission of each block. Thus the block number indicated by the odd-even block counter 29 should not be the same as the block number indicated by the return signal since that block number represents the number of the preceding block which was transmitted by the transmitting station 20. The transmitting station control 30 compares the block number indicated in the return signal with the output of the block counter 29; and if these numbers are the same, the transmitting station is caused to go into an alarm condition. If the block numbers are different, block synchronization has been maintained. If the answer-back signal indicates that the previous block was received error free, the transmitting station continues to operate as if the transmitting station control 30 did not exist. If the answer-back signal indicates an error in the previous block, the transmitting station control 30 supplies a signal to the parity check character generator 27 causing the parity check character to be inverted (errored), thereby forcing an error in the block being transmitted at the time the answer-back signal was received. At the same time, the transmitting station control 30 causes the tape reader 24 to be stopped for a period of time sufficient to allow transmission of two blocks of information from the memory unit 26. The station control 30 then causes the last two blocks to be retransmitted from memory, and the system otherwise operates in the same manner as it did when transmission was made from the tape reader 24.

It should be noted that the forcing of an error in the parity check character in the second block is necessary to prevent the receiver from recording this block prior to the recording of the previous block which was received in an errored condition. Thus, in normal procedure upon the occurrence of an errored block, the transmitting station forces an error in the next block and retransmits two blocks.

It is possible that a line break or noise burst on the return channel between the digital subsets 22 and 23 may cause the transmitting station to detect no response, that is the presence of none of the four possible signals which should be received from the receiving station. In such an event, the transmitting station control 30 causes an error to be forced in the parity check character of the block being transmitted as described previously; and the transmitting station then awaits receipt of a proper answer-back signal from the receiving station. Since it is not known whether or not the block from which the return signal was received correctly or was errored, the transmitting station may receive one of two possible answer-back signals when connections between the stations are re-established. If the previous block was received error free, only the second block in which the error was forced should be errored and the answer-back signal then will indicate the same block number as indicated by the odd-even block counter 29 at the transmitting station. In such an event, the station control 30 causes the tape reader 24 to be stopped for a length of time equal to the transmission time of one block; and only the last block is retransmitted from the memory 26. If the block number in the answer-back signal is different from the block number indicated by the odd-even block counter 29, the previous block for which the signal should have been received was errored and two blocks are rerun from the memory 26. If the answer-back signal received after such a no response condition indicates either an odd or even block received error free (BOK), the station control 30 causes the transmitting station to be placed in an alarm condition since such an answer-back signal is not possible, because the last block transmitted was forced to be errored by means of the operation of the transmitting station control 30.

Referring to FIGS. 3 to 7 of the drawings it will be noted that a number of boxes labeled "FF" appear therein. These boxes represent flip-flop circuits of the type disclosed in FIG. 2 of copending application No. 469,522, filed in the name of H. D. Cook on July 6, 1965. The particular internal circuitry of these flip-flops forms no part of this invention and reference may be made to application No. 469,522 for details of their operation. However, it should be noted that these flip-flops are all of the type in which the trigger inputs must be gated with a direct current priming potential before the trigger input has any affect on the operation of the flip-flop. For convenience, the two states of the flip-flop are designated "0" and "1." The priming input for the level of the flip-flop is designated on the drawing by the letter "P." The priming input which is gated with a particular trigger input is designated in the drawings by placing the same letter "A" or "B" at both the trigger and priming inputs of the flip-flop. For example, a trigger input used to set a flip-flop to its "0" state is designated on the drawings as "0B" or "0A" and this trigger input is gated with a priming input "P0B" or "P0A," respectively. The outputs of the flip-flop are labeled merely "0" or "1" with a positive output potential being obtained from the output to which the flip-flop is set, and a negative potential being obtained from the other output at the same time.

In the ensuing description of the operation of the circuit shown in the figure, the terms "positive" and "negative" potential are used to identify the relative voltages being employed in the circuit. It should be understood, however, that in actual practice such potentials need not be positive and negative but, by way of example, could as well be 0 volts and −6 volts or +6 volts and 0 volts, respectively, depending on the particular circuit components utilized. It is felt, however, that the use of the terms "positive" and "negative" will serve to differentiate the relative potentials used and will facilitate an understanding of the operation of the circuit.

Figure 3:
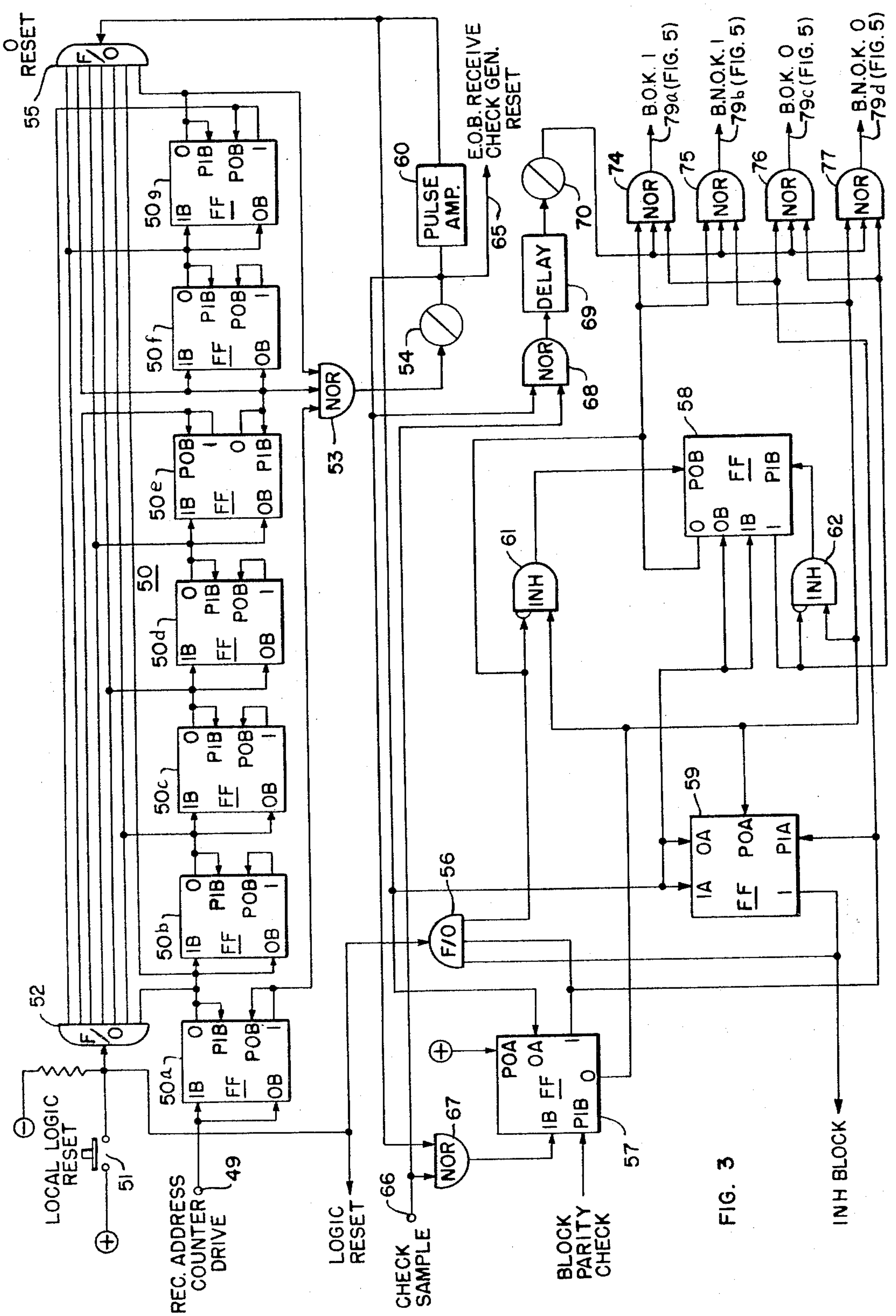
FIGS. 3 to 7 are divided into quadrants for facilitating the location of elements referred to in the specification.

A preferred embodiment of the invention is shown in the detailed circuit diagrams of FIGS. 3 through 7. Since each of the stations utilized in such a preferred embodiment of the invention may include both transmitting and receiving apparatus some of the circuit components utilized when the system is operating as a transmitter may be shared in common with other components utilized when the system is operating as a receiver in order to economize on the equipment necessary for complete send-receive stations. In the ensuing description however, the portion of the system necessary for operation as a receiver will be discussed separately from the operation of the system as a transmitter and the circuits have been separated so that those circuit elements necessary for the system operating as a receiver alone are shown in FIG. 3 while the remainder of the FIGS. 4 through 7 show the components necessary for the operation of the system as a transmitting station.

Although all of the circuit elements shown in FIGS. 3 through 7 are interconnected into a common system, no attempt has been made to show these circuits in a single circuit diagram covering multiple sheets of the drawings since to do so would result in unwieldy and difficult to follow circuit diagrams. Instead of showing the system in a single circuit diagram, FIGS. 3 through 7 each are directed, insofar as possible, to a portion of the system performing a specific function. Input and output leads on each of these figures which are to be connected to similar leads in other figures of the drawings are given the same reference numeral in both figures with the addition of being identified by showing to which figure or from which figure these leads are interconnected.

Figure 2:
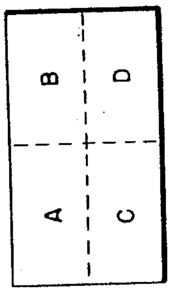

In order to facilitate further an understanding of the drawings, reference should be made to FIG. 2 which represents the outline of each of the sheets of the drawings including FIGS. 3 through 7. As indicated in FIG. 2, each of these sheets is to be considered divided into quadrants designated A, B, C, D, respectively, as shown in FIG. 2. In the following detailed description of a preferred embodiment of the invention, the elements found in the respective FIGS. 3 through 7 of the drawings are identified so that each reference numeral first bears a designation indicating the figure of the drawing in which the particular element identified is located. This figure designation then is followed by a designation A, B, C, or D indicating the particular quadrant of the drawing in which the element is found; and finally, the particular reference numeral assigned to that element is used. For example, the check character error flip-flop shown in FIG. 3 of the drawings is identified as flip-flop 3C–57 indicating that this flip-flop 57 appears on FIG. 3 in quadrant "C" of the figure.

RECEIVING STATION

Referring now to FIG. 3 there is shown a detailed circuit diagram of a block synchronization circuit for the receiving station of an error detecting and correcting system made in accordance with the preferred embodiment of this invention. Since the reception of telegraph signals and the generation and comparison of parity check characters at the end of each received block of information forms no part of this invention, as stated previously, no showing of such circuit components is made in FIG. 3.

In FIG. 3 there is shown a character counter 3AB–50 which is a standard seven-stage binary counter in which 81 count positions 0 through 80 are used. The flip-flops utilized in each of the stages of the counter 3AB–50 are designated **3A–50*a*, 3A–50*b*, 3A–50*c*, 3A–50*d*, 3B–50*e*, 3B–50*f*, and 3B–50*g*, respectively. Initially, the counter is set to store a count of 80 which represents a full count of the number of characters in a block (80 characters per block being an arbitrary figure used for purposes of illustration). This is accomplished by operatiton of a local reset button 3A–51 which causes a positive potential to be applied through a fan-out gate 3A–52 which then applies this positive pulse to reset the counter flip-flops 3AB–50*a* through 3AB–50*g* by means of collector reset to the count 80 (1 0 1 0 0 0 0). This is accomplished by setting stages 3A–50*a* through 50*d* and 3B–50*f* to "0" and by setting stages 3B–50*e* and 3B–50*g* to "1." With the counter storing the count of 80, a negative potential is applied to each of three inputs of a NOR gate 3B–53 which detects this count. As a consequence, the output of the NOR gate 3B–53 is positive at this time, and this positive output of the NOR gate 3B–53 is inverted by an inverter 3B–54 causing a negative output signal to be applied to the input of a pulse amplifier 60. The pulse amplifier 3B–60 provides a positive pulse at its output in response to a positive transition at its input, so that a negative signal is obtained from its output and is applied to the input of a "0" reset fan-out gate 3B–55 at this time. As a consequence, the fan-out gate 3B–55** is not operated.

Operation of the local reset button 3A–51 also causes a positive pulse to be applied to another fan-out gate 3C–56. The output of the fan-out gate 3C–56 is applied to the "1" outputs of a parity error register flip-flop 3C–57 and a record block inhibit flip-flop 3C–59 and resets those flip-flops by means of collector reset to their "1" or error indicating state. The output of the fan-out gate 3C–56 also is applied to the "0" output of a block counter flip-flop 3D–58 to reset that flip-flop to its "0" state indicating that a "0" or odd block is about to be received by the system. The receiver circuit shown in FIG. 3 now is ready for the receipt of a message from the transmitting station.

Positive clock pulses are derived from the incoming signals applied to the receiving station by any suitable circuit (not shown) and occur once per character. These clock pulses are applied to the receive address counter drive terminal 3A–49 and are supplied to the trigger inputs 1B and 0B of the flip-flops 3A–50*a*. The first clock pulse received on the terminal 3A–49 following the logic reset described above, causes the flip-flop 3A–50*a* to be set to its "1" state. This causes a positive output signal to be obtained from the "1" output of the flip-flop 3A–50*a*, and this signal applied to the input of the NOR gate 3B–53 causes the output of the NOR gate to drop to a negative potential. This drop in potential is inverted by the inverter 3B–54 to form a positive pulse which causes the pulse amplifier 3B–60 to apply a positive pulse of short duration to the fan out gate 3B–55. The output of the gate 3B–55 is a positive reset pulse which is applied to all of the "0" outputs of the flip-flops used in the counter 3AB–50 to reset the counter 3AB–50 to "0" (0 0 0 0 0 0 0).

The positive sample pulse obtained from the output of the pulse amplifier 3B–60 at this time also is applied to the 1A and 0A trigger inputs of the inhibit block flip-flop 3C–59 and to the 0B and 1B trigger inputs of the block counter flip-flop 3D–58. This first sample pulse has no affect on the block counter flip-flop 3D–58 at this time since no priming potential is applied to either the P0B or P1B of the flip-flop. This is caused by the fact that the parity error flip-flop 3C–57 is reset to its "1" condition at this time causing a negative signal to be obtained from its "0" output. This negative signal is applied to a pair of inhibit gates 3C–61 and 3D–62, the outputs of which form the respective priming inputs to the block counter flip-flop 3D–58. As a consequence, both of these priming inputs are negative at this time and trigger pulses applied to the flip-flop 3D–58 have no affect upon it. The flip-flop 3D–58 remains in its "0" state indicating that the "0" or odd block is being received.

The positive output signal obtained from the "1" output of the flip-flop 3C–57 is applied directly to the priming input P1A of the inhibit block control flip-flop 3C–59. This negative output signal obtained from the "0" output of the flip-flop 3C–57 is applied to the priming input P0A of the flip-flop 3C–59. As a consequence, when the positive trigger pulse is applied to the trigger inputs 1A and 0A of the flip-flop 3C–59 it remains set to its "1" state causing a positive signal to be obtained from its "1" output. This positive signal then is supplied to a record control gate (indicated generally as 41 in FIG. 1) to prevent the recording apparatus (not shown) from recording any information being supplied from the memory 36 (FIG. 1) during the receipt of this first block of information. It should be noted at this time that whenever the inhibit block flip-flop 3C–59 is set to its "0" state thereby causing a negative output to be obtained from its "1" output, the receiving apparatus is allowed to record the information being supplied to it from the buffer memory at the receiver. On the other hand, whenever the "1" output of the flip-flop 3C–59 is a positive output, the recording apparatus at the receiving station is prevented from recording the block being supplied to it from the buffer memory.

The first positive sample pulse obtained from the output of the pulse amplifier 3B–60 in response to the first received address drive pulse applied to the terminal 3A–49 also is applied to the 0A trigger input of the parity error flip-flop 3C–57 to reset that flip-flop to its "0" state due to the fact that the priming input P0A of the flip-flop is permanently primed by the application of a positive potential thereto. This reset pulse allows the flip-flop 3C–57 to be responsive to subsequent block parity check error indication signals applied to its priming input P1B from the output of a parity comparison circuit (39 in FIG. 1).

Successive address count drive pulses obtained from each succeeding received character cause the count to advance in a manner well known in the art. When the count next reaches the count 80, the NOR gate 3B–53 once again is enabled, causing a positive output to be obtained and inverted by the inverter 3B–54 in the manner stated previously. At count 80, the format of the received signal is such that the parity check character for the block is being compared with a local parity check character in the comparison circuit 39 (FIG. 1) in a manner well known in the art. The output of the comparison circuit is applied to the P1B priming input of a parity error register flip-flop 3C–57. If the block upon which the parity check is made is error free, this priming input signal is a negative potential and has no affect on the operation of the flip-flop 3C–57. If, however, an error did occur in the block, the signal applied to the P1B input of the flip-flop 3C–57 is a positive priming potential.

The positive signal obtained from the output of the NOR gate 3B–53 during the count 80 after being inverted by the inverter 3B–54 causes a negative signal to be applied to the output lead 3B–65. This output may be utilized to inhibit the operation of the parity check generator 37 (FIG. 1) during receipt of this 81st character, since the 81st character is the partity check character which was generated at the transmitter. This parity check character is compared with the parity check character generated at the receiver to provide the block parity check priming signal applied to the P1B priming input of the flip-flop 3C–57.

Approximately 400 microseconds after the receipt of the counter drive pulse which causes the character counter 3AB–50 to step to its 80th count, a negative check sample pulse of approximately two hundred microseconds duration is applied to the input terminal 3A–66. This pulse is passed by a NOR gate 3A–67 which is enabled at this time by the negative signal obtained from the output of the inverter 3B–54. The output of the NOR gate 3A–67 is a positive pulse which is applied to the trigger input 1B of the flip-flop 3C–57. If the block upon which the parity check was made was error-free, the priming signal applied to the priming input P1B of the flip-flop 3C–57 is negative thereby causing the trigger input applied to the 1B input of the flip-flop to have no affect on the flip-flop 3C–57. As a consequence, the flip-flop 3C–57 remains set to its "0" state with a negative output signal being obtained from its "1" output so long as error free blocks are received by the system.

If, however, an error did occur in the block on which the parity check was made, the signal applied to the P1B input of the flip-flop 3C–57 is a positive priming potential and when the trigger pulse is applied to the trigger input 1B of the flip-flop 3C–57, the flip-flop is set to its "1" state indicating an error occurred in the block just received. When this happens, the "1" output of the flip-flop 3C–57 is a positive signal and the "0" output of the flip-flop is a negative signal.

The negative check sample pulse which is utilized to trigger the parity error flip-flop 3C–57 also is applied to a NOR gate 3D–68 which is enabled by the negative output of the inverter 3B–54 at this time. The positive output pulse obtained from the NOR gate 3D–68 is delayed for approximately 100 microseconds by a delay circuit 3D–69 and is inverted by an inverter 3D–70. The output of the inverter 3D–70 is utilized as a negative answer-back sample pulse which is applied to four NOR gates 3D–74, 3D–75, 3D–76 and 3D–77. One of the three inputs of the NOR gates 3D–74 and 3D–75 is obtained from the "0" output of the odd-even block counter flip-flop 3D–58. In a like manner, one of the three inputs to the NOR gates 3D–76 and 3D–77 is obtained from the "1" output of the block counter flip-flop 3D–58. The third input to the NOR gates 3D–74 and 3D–76 is obtained from the "1" output of the flip-flop 3C–57. The third input to the NOR gates 3D–75 and 3D–77 is obtained directly from the "0" output of the flip-flop 3C–57 and, therefore, is of opposite potential to the potential of the "1" output of the flip-flop 3C–57.

The combinations of these output signals from the flip-flops 3C–57 and 3D–58 constitute the four possible combinations of errored or error-free and odd or even blocks which may occur for the receipt of a block. For example, assume that the first block was received error-free. When this occurs, the "0" output of the parity error flip-flop 3C–57 is positive causing a positive potential to be applied to the inputs of the NOR gates 3D–75 and 3D–77 thereby causing these NOR gates to have a negative signal on their outputs. At the same time, the flip-flop 3D–58 was reset to its "0" state at the beginning of receipt of this first block of information thereby causing its "0" output to be positive and its "1" output to be negative at the time the negative sample pulse from the output of the inverter 70 occurs. The positive output signal obtained from the "0" output of the flip-flop 3D–58 is applied to the inputs of the NOR gates 3D–74 and 3D–75 thereby causing both of these NOR gates to have a negative output signal at this time. The only NOR gate of the four gates 3D–74 through 3D–77 which has two negative input signals applied to it at this time is the NOR gate 3D–76. This NOR gate 3D–76 then is enabled; and when the negative answer-back sample pulse is obtained from the inverter 3D–70, a positive pulse is obtained from the output of the NOR gate 3D–76 indicating that block "0" (odd) was received error-free (BOK "0"). This is indicated on the drawing by labeling the output lead 3D–79*c* of the NOR gate 3D–76, "BOK–0."

If this first block is received errored, the parity error flip-flop 3C–57 is set to its "1" state as described previously. In such an event, a negative output signal is obtained from the "0" output of the flip-flop 3C–57; causing a negative signal to be applied to the NOR gate 3D–77. This signal combined with the negative signal obtained from the "1" output of the block counter flip-flop 3D–58 causes the NOR gate 3D–77 to be the only NOR gate which is enabled under such a combination of conditions. The answer-back sample pulse then causes a positive pulse to be obtained from the output of the NOR gate 3D–77. This output pulse indicates that the block received was odd and that it was errored. On the drawing the output lead 3D–79*d* of the NOR gate 3D–77 has been indicated "BNOK–0." Comparable analysis will show that a positive output of the NOR gate 3D–74 on lead 3D–79*a* indicates an even ("1") block received error-free (BOK "1") and that a positive output of the NOR gate 3D–75 on lead 3D–79*b* indicates an even ("1") block received errored (BNOK "1"). The output pulses obtained on the leads 3D–79*a* to 3D–79*d* then may be utilized to control a suitable answer-back signal generator 40 (FIG. 1) which has not been shown in detail. The four discrete signals obtained on these leads are supplied to the digital subset 23 at the receiving station, which transmits one of four signals corresponding to the output of the particular NOR gate 3D–74 to 3D–77 which was enabled to the transmitting station. At the transmitting station these signals are decoded into one of four discrete return signals on respective input leads which correspond to the outputs of the NOR gates 3D–74 to 3D–77. It should be noted that it is possible to connect the outputs of the NOR gates 3D–74 through 3D–77 directly to respective inputs at the transmitting station by independent conductors or leads. For purposes of illustration this has been indicated in the drawings with the output leads of the NOR gates 3D–74 through 3D–77 being identified as 3D–79*a* through 3D–79*d*, respectively, in FIG. 3 and being identified as input leads 5A–79*a* through 5C–79*d*, respectively, in FIG. 5 which forms part of the transmitting station.

Assuming for the purpose of illustration, that the first block was received error free, the next receive address counter drive pulse applied to the circuit on the input terminal 3A–49 causes the character counter 3AB–50 to be reset to zero in the manner described previously. When the output of the NOR gate 3B–53 once again drops to a negative potential, a positive going pulse is obtained from the output of the pulse amplifier 3B–60. This pulse is applied to the trigger inputs 1A and 0A of the block inhibit flip-flop 3C–59 as described previously. At this time, however, the flip-flop 3C–59 is set to its "0" state since the positive "0" output of the flip-flop 3C–57 causes a positive priming pulse to be applied to the priming input P0A of the flip-flop 3C–59.

As a consequence, the "1" output of the flip-flop 3C–59 drops to a negative potential thereby removing the inhibit signal which was applied to the recording apparatus at the receiver during receipt of the first block of information. This first block of information now is supplied from the buffer memory 36 (FIG. 1) through the record control circuit 41 to the recording apparatus 43 where it is recorded simultaneously with receipt of the second block of information by the buffer memory 36.

The positive reset pulse obtained from the output of the pulse amplifier 3B–60 also is applied to the trigger inputs 0B and 1B of the block counter flip-flop 3D–58 as described previously. The priming input P1B of the flip-flop 3D–58 has a positive potential applied to it at this time from the output of the inhibit gate 3D–62 since a negative potential is applied to the inhibit input of the gate 3D–62 from the "1" output of the flip-flop 3D–58 and a positive potential is applied to the other input of the inhibit gate 3D–62 from the "0" output of the flip-flop 3C–57. The inhibit gate 3C–61 has a negative output at this time since a positive potential is applied to its inhibit input from the "0" output of the flip-flop 3D–58. As a consequence, the flip-flop 3D–58 is triggered to its "1" state causing a positive potential to be obtained from its "1" output and a negative potential to be obtained from its "0" output. So long as error free reception of signals occurs, the flip-flop 3D–58 is reset to a different state at the beginning of each received character by the positive pulses obtained from the inverter 3D–54. As a consequence, the NOR gates 74 and 75 are enabled by the "0" output of the flip-flop 3D–58 during the time that an even or "1" block is received, and the NOR gates 76 and 77 are enabled during the time an odd or "0" block is being received.

In the event that an error occurs in a received block, the parity error flip-flop 3C–57 is set to its "1" state, as stated previously, thereby causing a negative signal to be applied to both of the inhibit gates 3C–61 and 3D–62. Consequently, the outputs of both of these gates, at the beginning of the next block when the positive reset pulse is received from the output of the pulse amplifier 3B–60, are negative; and the block counter flip-flop 3D–58 is not reset to a different state since neither priming input P1B or P0B has a positive priming potential applied to it in such an event. The block counter 3D–58 thus remains set to the block count of the block in which the last error occurred, and it remains set to this condition until a good or error-free block is received by the system. This results from the fact that after receipt of an error free block, the "0" output of the parity error flip-flop 3C–57 is positive, which, provides the necessary positive potentials to the inhibit gates 3C–61 and 3D–62 to allow positive priming signals to be applied to the flip-flop 3D–58.

TRANSMITTING STATION

Figure 4:
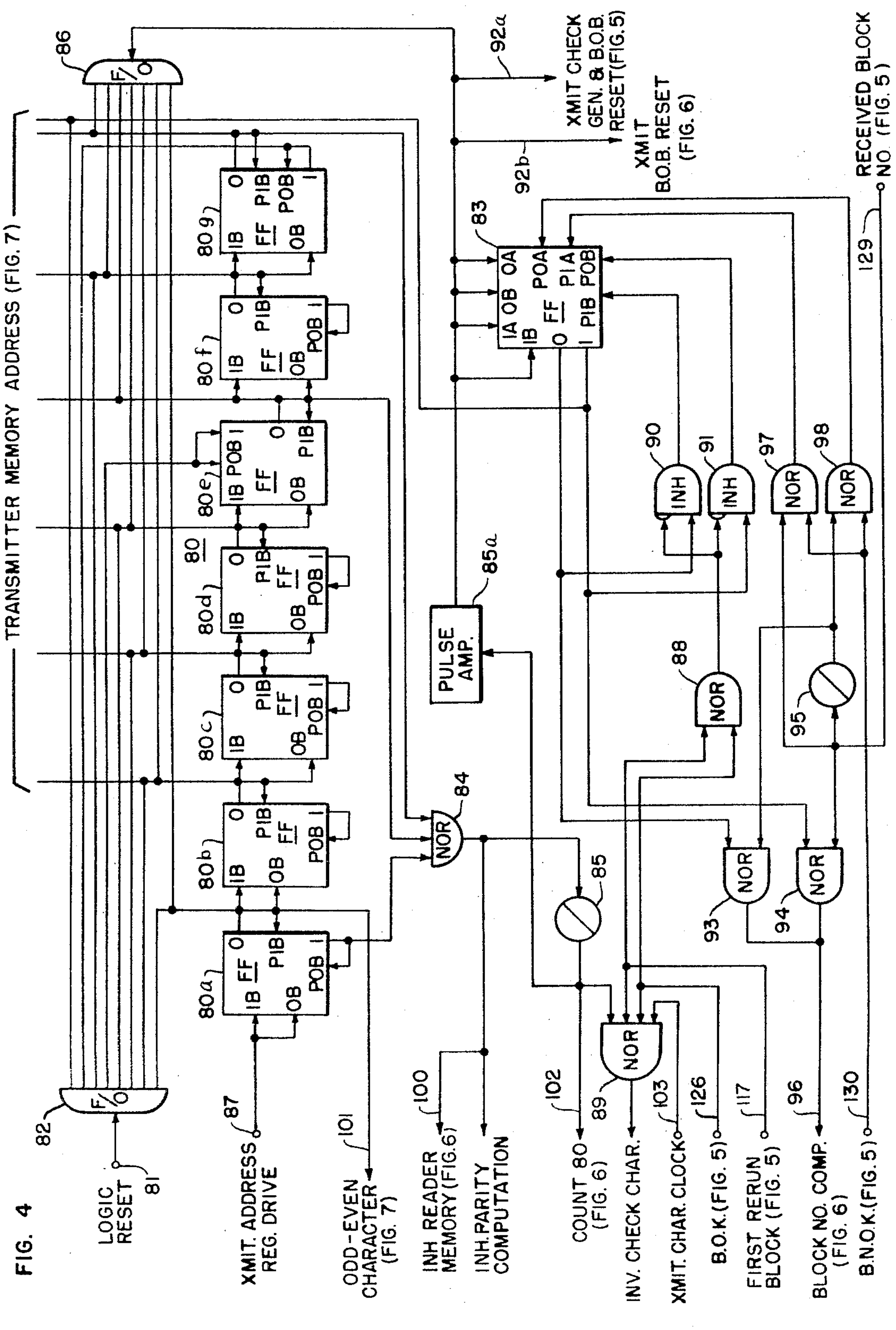

The transmitting station circuit is shown in FIGS. 4, 5, 6 and 7. Referring now to FIG. 4 there is shown the transmit memory address register and character counter which provides the basic timing operations utilized in the remainder of the transmitting circuit. The character counter is a seven-stage binary counter 4AB–80 consisting of seven flip-flops 4A–80*a* through 4B–80*g*, respectively. Prior to the sending of information, data from the transmitting station, a positive logic reset pulse is applied to a reset terminal 4A–81. This positive pulse then is supplied through a fan out gate 4A–82, the output of which is utilized to reset the binary counter 4AB–80 by means of collector reset to the count of 80 (1 0 1 0 0 0 0). A positive pulse also is applied to a block counter flip-flop 4D–83 to reset that flip-flop to its set "1" condition.

The output of the memory address counter register 4AB–80 and the "1" output of the odd-even block counter flip-flop 4D–83 are supplied to a random access memory 7B–180 to control the loading of information into, and the reading of information from proper addresses of the memory. Only the six upper order binary stages **4A–80*b* through 4B–80*g* plus the output of the block counter flip-flop 4D–83 are used for the memory address. The low order stage 4A–80*a* of the counter is utilized to count odd-even characters. As a consequence, when the stages 4A–80*b* through 4B–80*g*** reach a count of 40, 80 characters in the transmitted message have been counted.

The reason for changing the address supplied to the random access memory only every other character is that in a preferred embodiment of the invention, each address of the memory has sufficient capacity to store two characters. The memory, however, does not contain 160 addresses, but rather has capacity for 128 addresses. Of course, with two characters being stored in each address, two 80 character blocks then may be stored in 80 address locations of the memory so that there remains a surplus of addresses. For the purpose of illustrating the present invention a random access memory with a capacity of 160 addresses could have been utilized, and the counter 4AB–80 for providing the proper address information then could be an eight-stage binary counter with each stage of the counter being utilized for supplying address information to the memory. The arrangement shown in FIG. 4 however, has been chosen to show a technique which can be utilized for a memory having a relatively large capacity per address but containing fewer addresses than the total amount of characters which it is desired to store in the memory.

Following the application of a logic reset pulse to the terminal 4A–81, as described above, the memory address is 104 (1 1 0 1 0 0 0), since the lowest order binary element stored in the flip-flop **4A–80*a* is not included in the memory address. At this time a NOR gate 4A–84 is enabled causing a positive signal to be obtained from its output. This positive signal is inverted by an inverter 4C–85, positive transitions at the output of which drive a pulse amplifier 4C–85*a*. At this time the output of the amplifier 4C–85*a* is negative and is applied to the input of a fan out gate 4B–86. Since the fan out gate 4B–86 is chosen to respond only to positive pulses, this negative signal has no affect upon it. The system now is ready to begin transmission from the tape reader 24** (FIG. 1).

When transmission is initiated, positive transmitter address drive pulses are obtained from a suitable clock (not shown) once for each character read by the tape reader 24 and are applied to a transmitter address register drive terminal 4A–87. These drive pulses are supplied to the 1B and 0B trigger inputs of the flip-flop **4A–80*a*. The first drive pulse applied to the flip-flop 4A–80*a* causes that flip-flop to be triggered to its "1" state since a positive priming signal was applied to its P1B priming input from the "0" output to which the flip-flop was set by the application of the logic reset pulse. When this occurs, the output of the NOR gate 4A–84 drops to a negative potential. This drop in potential is inverted by the inverter 4C–85 causing a positive pulse to be obtained from the output of the pulse amplifier 4C–85*a* as a positive beginning of block reset pulse. This pulse is applied to the fan out gate 4B–86 which causes all of the stages of the memory address register to be set to their "0" state (0 0 0 0 0 0 0). The transmitter odd-even block counter flip-flop 4D–83** also is set to its "0" state at this time thereby indicating that an odd numbered block is being transmitted.

Successive address register drive pulses occurring once per character of the transmitted information cause the counter 4AB–80 to advance continuously in an obvious manner. When the counter has reached a count of 80 (at the 81st character to be transmitted), the NOR gate 4B–84 once again is enabled causing a positive signal to appear at its output for one character interval. During this character interval, the positive output signal of the NOR gate 4B–84 is supplied over lead 4A–100 to the rerun control logic of FIG. 6 to stop the operation of the tape reader for one character interval. This positive signal also is utilized to inhibit operation of the check character parity generator and to cause the check character obtained from the parity check character generator to be distributed to the digital subset 22 (FIG. 1). The manner in which the parity check character is added to the end of the block of information characters transmitted from the transmitting station will not further be described since techniques for doing this are well-known in the art and form no part of this invention. For the purpose of illustrating the operation of this invention in an error detection and correction system utilizing block transmission, it is sufficient to state that the output of the NOR gate 84 may be utilized to effect and control the above operation.

Following the distribution of the parity check character on the transmission line, the next address register drive pulse applied to the terminal 4A–87 causes the flip-flop **4A–80*a* to be reset to its "1" state, as stated previously, thereby causing the output of the NOR gate 4A–84 once again to drop to a negative potential and the tape reader resumes operation. In addition, the counter 4AB–80 is reset to "0" in the manner stated previously, and the block counter flip-flop 4D–83 is set to its "1" state since its P1B priming input has a positive potential applied to it at this time, as will be more fully described subsequently. As a consequence, the block counter 4D–83 now indicates that an even numbered block is being transmitted. The "1" output of the flip-flop 4D–83 now is a positive potential and is supplied to the transmitter memory address causing the sequence of the memory address now to go from count 64 to 104 during transmission of the next block. When another 81 characters are counted, the counter 4AB–80 once again is reset to "0," the odd-even flip-flop 4D–83** is reset to its "0" or odd state and the address count then advances from 0 to 40 and from 64 to 104 continuously repeating the foregoing sequence. So long as normal error free transmission continues, this is the sequence of operation which occurs.

Figure 5:
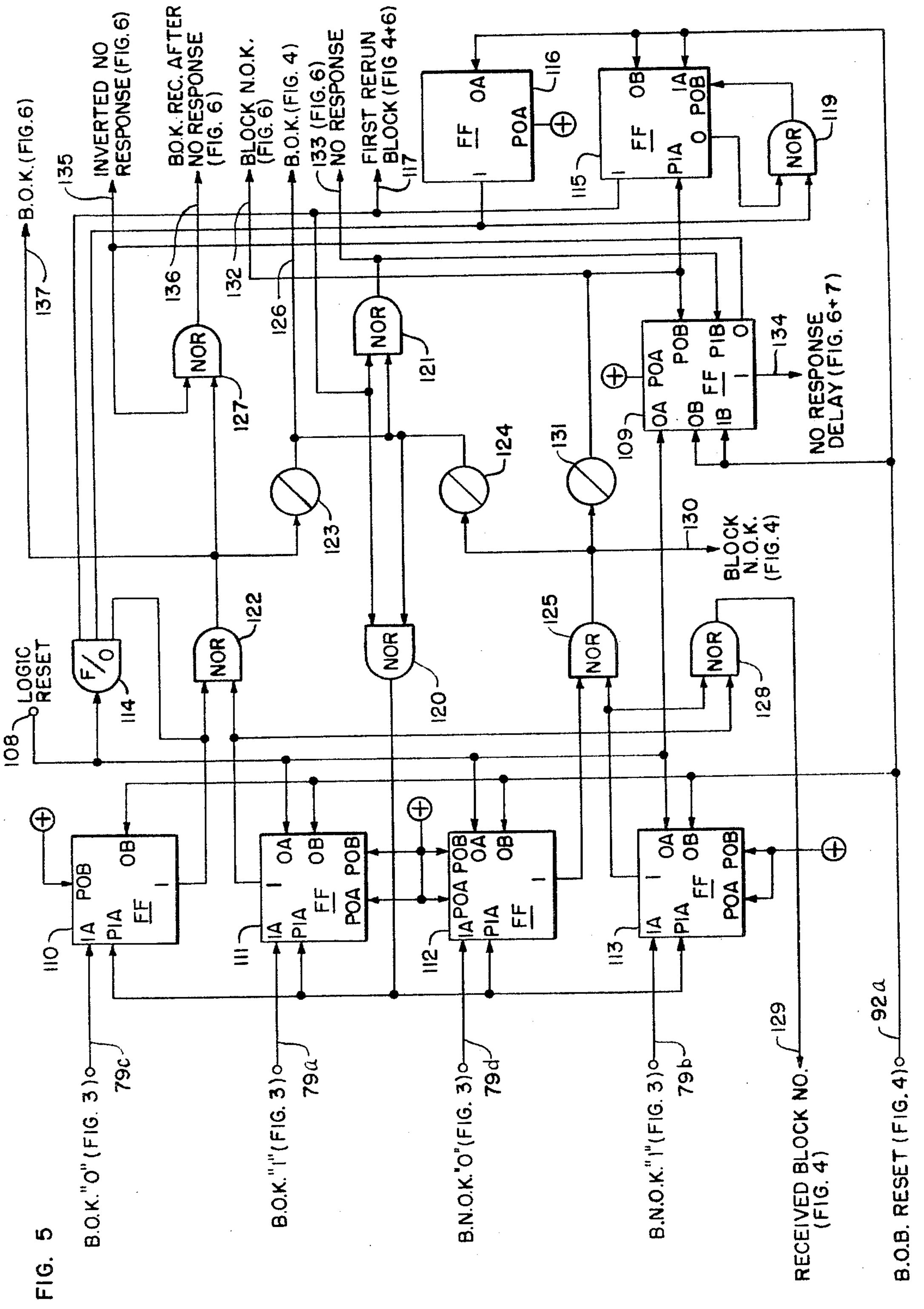

Prior to the transmission of any data by the transmitter, the positive logic reset applied to the terminal 4A–81 also is utilized to reset the transmitter answer-back logic shown in FIG. 5. At the same time that a logic reset pulse is applied to the terminal 4A–81, a positive reset pulse also is applied to the terminal 5A–108. This pulse is applied to the 0A trigger inputs of a no-response flip-flop 5D–109 and three answer-back register flip-flops 5A–111, 5C–112 and 5C–113 to reset these flip-flops to their "0" state. This occurs since the priming inputs P0A of these flip-flops are permanently primed by the application of a positive potential thereto. The positive pulse applied to the terminal 5A–108 also is supplied through a fan-out gate 5A–114, the output of which resets an answer-back register flip-flop 5A–110, a first rerun block flip-flop 5D–115 and a first block register flip-flop 5D–116 to their "1" state by means of collector reset.

Since the first rerun block register flip-flop 5D–115 is set to its "1" state prior to the initiation of any transmission, the positive output obtained from its "1" output and applied over output lead 5D–117, 4C–117 to the inputs of NOR gates 4C–88 and 4C–89 causes these NOR gates to have negative outputs so long as the flip-flops 5D–115 remains in its "1" state. This negative output of the NOR gate 4C–88 is applied to the inhibit inputs of a pair of inhibit gates 4D–90 and 4D–91. The output of the inhibit gate 4D–90 is applied to the priming input P1B of the odd-even block counter flip-flop 4D–83 and the output of the inhibit gate 4D–91 is applied to the priming input P0B of the flip-flop 4D–83. The "1" output of the flip-flop 4D–83 is applied to the input of the inhibit gate 4D–91 and the "0" output of the flip-flop 4D–83 is applied to the input of the inhibit gate 4D–90. Whenever a negative potential is applied to the inhibit inputs of the inhibit gates 4D–90 and 4D–91 from the output of the NOR gate 4C–88, the inhibit gate 4D–90 has a positive output whenever the flip-flop 4D–83 is set to its "0" state and the inhibit gate 4D–91 has a positive output whenever the flip-flop 4D–83 is set to its "1" state. Thus, following application of a logic reset pulse to terminal 4A–81 and prior to transmission of the first block, a positive potential is obtained from the output of the inhibit gate 4D–91 priming the P0B input of the flip-flop 4D–83. When the first beginning of block reset pulse obtained from the output of the pulse amplifier 4C–85*a* upon application of the first drive pulse to the terminal 4A–87 is applied to the trigger input 1B of the flip-flop 4D–83, the flip-flop is set to its "0" state simultaneously with transmission of the first character of the first block. This beginning of block reset pulse also is supplied over a lead 4D–92*a*, 5B–92*a* to the transmitter answer-back logic of FIG. 5 where it is applied to the 0B trigger inputs of the answer-back flip-flops 5A–110, 5A–111, 5C–112, and 5C–113 to set them to their "0" state since they are permanently primed by the application of a positive potential to their priming inputs P0B. It should be noted that these answer-back flip-flops are reset to their "0" state in this manner by the beginning of block reset pulse at the beginning of each block. The first beginning of block reset pulse also is applied to the 0A trigger input of the first block register flip-flop 5D–116 causing that flip-flop to be set to its "0" state since its priming input P0A is permanently primed by the application of a positive potential thereto.

This first beginning of block reset pulse has no effect on the first rerun block flip-flop 5D–115 since the priming potential applied to its priming input P0B is negative at this time due to the fact the NOR gate 5D–119 from which it is obtained has a positive potential applied to it from the "1" output of the first block flip-flop 5D–116. As a consequence, the first rerun register flip-flop 5D–115 remains in its set "1" state until the end of the first block when another beginning of block reset pulse is applied to the lead 4D–91, 5B–91. When this occurs the flip-flop 5D–115 is set to its "0" state since it has a positive priming potential applied to its priming input P0B from the output of the NOR gate 5D–119 at that time. The combination of the first block register flip-flop 5D–116 and the NOR gate 5D–119 simulate the rerun start-up of the first block of a message without actually rerunning from the memory. During transmission of the first block or the first rerun block, the return signal, if any, from the receiving station conveys any meaning; and as a consequence, the output of the first rerun block flip-flop 5D–115 causes the NOR gate 4C–88 to be blinded to any return signals during the first block or first rerun block.

In addition to enabling the inhibit gates 4D–90 and 4D–91 which control the odd-even block counter 4D–83 priming potentials P1B and P0B, the "1" output of the first rerun flip-flop 5D–115 during transmission of the first block causes a positive potential to be applied to a NOR gate 5A–120 thereby causing a negative output to be obtained from that NOR gate. This negative output is applied to the priming inputs P1A of the four answer-back flip-flops 5A–110, 5A–111, 5C–112 and 5C–113 thereby causing these flip-flops to be rendered nonresponsive to any answer-back signal occurring during the first block. The positive output obtained from the "1" output of the flip-flop 5D–115 also is applied to the input of a NOR gate 5B–121 causing the output of that gate to remain at a negative potential thereby overriding the no-response signal which occurs when the answer-back registers do not respond to a return signal from the receiver. This simulates a block error free (BOK) return signal answer-back without the system indicating a BOK signal at the output of a NOR gate 5A–122 which occurs in a manner to be described subsequently.

The foregoing description establishes the condition of the transmitting station address register and answer-back logic for the transmission of the first block. At the end of the first block, the first rerun block flip-flop 5D–115 is reset to its "0" state by the application of the beginning of block reset pulse present on the lead 5B–92*a* to the trigger input 0B of the flip-flop 5D–115, since a positive priming potential is applied to the priming input P0B of the flip-flop 5D–115 at this time from the output of the NOR gate 5D–119. The inputs to the NOR gate 5D–119 now both are "0" since they are obtained from the "1" output of the first block flip-flop 5D–116 which was set to its "0" state by the application of the first beginning of block reset pulse which occurred at the beginning of transmission, and the other input to the NOR gate 5D–119 is obtained from the "0" output of the flip-flop 5D–115 which is negative at this time since the flip-flop 5D–115 was in its set "1" condition prior to the receipt of this second beginning of block pulse.

As stated previously, the beginning of block reset pulses also are supplied to all of the answer-back flip-flops 5A–110, 5A–111, 5C–112, and 5C–113 to set these flip-flops to their "0" state at the beginning of each block. During the course of transmission of the second and all subsequent blocks from the transmitting station, the receiving station supplies a return signal to the transmitting station indicating whether or not the previous block was received errored or error-free and whether or not that block was an odd (0) or an even (1) block. These return signals are indicated in the drawing as BOK "0" (odd block received error free), BOK "1" (even block received error-free), BNOK "0" (odd block received errored), and BNOK "1" (even block received errored). As stated previously in conjunction with the description of the receiving circuit shown in FIG. 3, these signals are applied to the return signal answer-back leads 3D–79*a* through 3D–79*d*, 5A–79*a* through 5C–79*d*, and occur in the form of a positive pulse on only one of these leads for any given block. The BOK "0" signals appearing on the the lead 5A–79*c* are applied to the trigger input 1A of the answer-back register flip-flop 5A–110. In like manner, input pulses appearing on the leads 5A–79*a*, 5C–79*b* and 5C–79*d* are applied respectively to the trigger inputs 1A of the answer-back flip-flops 5A–111, 5C–113 and 5C–112. Thus the flip-flops 5A–110 through 5C–113 are set to store the particular return signal which is received from the receiving station since the priming inputs P1A of all of the answer-back flip-flops are primed by a positive potential obtained from the output of the NOR gate 5A–120. The inputs to the NOR gate 5A–120 both are negative at this time, one of them being obtained from the "1" output of the flip-flop 5D–115 and the other being obtained from the output of two inverters 5B–123 and 5D–124, the outputs of both of which are negative at this time.

The input of the inverter 5B–123 is positive at this time since it is obtained from the output of the NOR gate 5A–122. The two inputs to the NOR gate 5A–122 are obtained from the "1" outputs of the address flip-flops 5A–110 and 5A–111 both of which are negative due to the fact that all of the answer-back flip-flops are set to the "0" state at the beginning of each block. The output of the inverter 5D–124 is negative at this time since it has a positive potential applied to its input, this potential being obtained from the output of a NOR gate 5C–125. The inputs to the NOR gate 5C–125 are obtained from the "1" outputs of the answer-back flip-flops 5C–112 and 5C–113.

As soon as a pulse is received on any of the leads 5A–79*a* through 5C–79*d* indicating a return signal from the receiving station, the corresponding answer-back flip-flop is set to its "1" state. This causes the NOR gate 5A–122 or 5C–125 which has an input connected to that particular flip-flop to have a positive potential applied to one of its inputs thereby causing its output to drop to a negative potential. This in turn is inverted by the respective inverter 5B–123 or 5D–124 causing the output of that inverter to appear as a positive potential. This positive potential overrides the output of the other of this pair of inverters and is applied to the input of the NOR gate 5A–120 causing the output of the NOR gate 5A–120 to drop to a negative potential. As a consequence, the priming potential is removed from the priming inputs P1A of the flip-flops 5A–110, 5A–111, 5C–112 and 5C–113 rendering them insensitive to any positive pulse appearing on any of the four leads **5A–79*a* through 5C–79*d***.

So long as normal error free transmission takes place, only the flip-flops 5A–110 and 5A–111 are set to their "1" state by return signals from the receiving station, and as long as the received block number and the transmitted block number are different at all times, the above cycle of operation is continuously repeated.

If the return signal from the receiving station indicates that an error free block was received, one or the other of the flip-flops 5A–110 or 5A–111 is set to its "1" state by this return signal. This in turn causes a positive signal to be applied to the NOR gate 5A–122 thereby causing its output to drop to a negative value. The output of the NOR gate 5A–122 is utilized to indicate that the block was received error free (BOK), and this signal is inverted by the inverter 5B–123 which then applies a positive signal to the output lead 5B–126. As stated previously, the output of the inverter 5B–123 also controls the operation of the NOR gate 5A–120. The positive output of the inverter 5B–123 also is applied to the input of the no response NOR gate 5B–121 causing the output of that NOR gate to drop to a negative potential.

It should be noted that so long as error free transmission takes place, a positive potential indicating the received block was error free (BOK) is applied to the lead 5B–126, 4C–126. This potential disables the NOR gate 4C–88 causing its output to be at a negative potential whenever the beginning of block reset pulse is obtained from the output of the inverter 4C–85. As a consequence, the transmit block counter 4D–83 is primed by its own "0" and "1" outputs through the inhibit gates 4D–90 and 4D–91 and is reset by the beginning of block reset pulse to a different state at the beginning of each transmitted block. A NOR gate 5C–128 is utilized to detect the received block number, that is, whether the return signal indicates that the received block was an odd (0) or an even (1) block. This is accomplished by obtaining both inputs to the NOR gate 5C–128 from the "1" outputs of the answer-back flip-flops 5A–111 and 5C–113, respectively. These flip-flops are associated with the input leads corresponding to an even (1) block received. Thus, if either of the flip-flops 5A–111 or 5C–113 is set to its "1" condition indicating that an even block has been received, the "1" output of that flip-flop rises to a positive potential thereby causing the output of the NOR gate 5C–128 to be at a negative potential. On the other hand, if the received block was an even "0" block, either the flip-flop 5A–110 or 5B–112 is set to its "1" condition with the flip-flops 5A–111 and 5C–113 remaining set to their "0" condition. When this occurs, both of the inputs to the NOR gate 5C–128 are negative and its output is positive.

Thus, the received block number is indicated on the output lead 5C–129 as a positive potential when the received block is an odd (0) block and as a negative potential when the received block is an even (1) block. This received block number is compared with the transmitted block number in a pair of NOR gtaes 4C–93 and 4C–94. The signals indicating the receiving block number applied to the lead 5C–129, 4C–129 are applied directly to one input of the NOR gate 4C–94 and are inverted by an inverter 4C–95, the output of which forms one of the inputs to the NOR gate 5C–93. The "0" and "1" outputs of the transmit block counter flip-flop 4D–83 are applied as the other inputs of the NOR gates 4C–93 and 4C–94, respectively. The outputs of the NOR gates 4C–93 and 4C–94 are tied together and when one of these outputs is positive it overrides the output of the other NOR gate.

As stated previously, a positive potential is applied to the lead 4C–129 when the received block is a "0" block. This causes the output of the NOR gate 4C–94 to be negative irrespective of the potential applied to its other input lead. The NOR gate 4C–93, however, is enabled whenever the received block is an odd block, since the inverter 4C–95 causes a negative potential to be applied to its input at that time. As a consequence, if the transmit block counter is set to its "1" state when the received block is an odd "0" block, the "0" output of the flip-flop 4D–83 also is negative causing a positive output to be obtained from the NOR gate 4C–93. This positive output signal appears on the block number comparison lead 4C–96 indicating that the received block number and the transmit block number are different at this time. This is the condition for normal operation when the transmitting and receiving stations are in block synchronization.

In a like manner, the output of the NOR gate 94 and the potential on the lead 4C–96 is a positive potential whenever the received block number is an even (1) block and the transmit block counter is set to its odd (0) state since both inputs of the NOR gate 4C–94 are negative in such a situation. Any time, however, that the received block number and the block number obtained from the transmit block counter flip-flop 4D–83 are the same, the outputs of both NOR gates 4C–93 and 4C–94 are negative causing a negative potential to be applied to the lead 4C–96 indicating that the block numbers are equal. Under all conditions of operation, with one exception which will be described subsequently, this negative potential on the lead 4C–96 indicates that the system is not in block synchronization.

If the return signal from the receiving station indicates that the block, whether it be an odd or even block, was received errored, an input pulse is applied to either lead **5C–79*d* or 5C–79*b* thereby setting the corresponding answer-back flip-flop 5C–112 or 5C–113 to its "1" state. When this occurs, one of the inputs to the NOR gate 5C–125 rises to a positive potential causing the output of that NOR gate to drop to a negative potential. This negative potential is applied directly to a lead 5D–130, 4C–130 and is inverted by an inverter 5D–131 which causes a positive priming potential to be applied to the priming input P0B of the no response flip-flop 5D–109 and to be applied to the priming input P1A of the first rerun block flip-flop 5D–115. This positive signal signifying that the received block was received errored (BNOK) also is applied to an output lead 5B–132, 6A–132. When the next beginning of block reset pulse is applied to the lead 5B–92*a*, 4D–92*a*, the first rerun flip-flop 5D–115 is set to its "1" state and the no response flip-flop 5D–109 is set to its "0" state (if it already is not in its "0" state) by the application of the positive reset pulse to the trigger input 1A of the flip-flop 5D–115 and to trigger input 0B of the flip-flop 5D–109**.

When an errored block return signal is received, the negative potential applied to the lead 4C–130, 5D–130 is applied to the inputs of a pair of block counter control NOR gates 4D–97 and 4D–98. The other input to these NOR gates is the received block number signal applied to the lead 4C–129, 5C–129 with this signal being applied directly to the input of the NOR gate 4D–97 and being inverted by the inverter 4C–95 which then applies it to the input of the NOR gate 4D–98. If the received block is an even (1) block, the potential on the lead 4C–129 is a negative potential. As a consequence, only the NOR gate 4D–97 is enabled when the negative block BNOK signal appears on the lead 4C–130 causing a positive priming potential to be applied to the priming input P1A of the block counter flop-flop 4D–83.

This priming potential remains until the next beginning of block reset pulse appears at the trigger inputs 1B, 1A, 0B, 0A of the flip-flop 4D–83. This trigger pulse then sets the transmit block counter flip-flop 4D–83 to its "1" state causing the transmit block counter flop-flop to be forced to correspond to the received block errored block number. In other words, if the received block number indicates an even block was received errored, BNOK "1," the transmit block counter 4D–83 is set to its "1" state at this time. This in turn sets transmitter memory address to cause the correct block to be rerun from the transmitting station memory in a manner to be more fully described subsequently. Whenever the return signal is BNOK "0" a positive output is obtained from the NOR gate 4D–98 in a manner similar to that described for the NOR gate 4D–97, and the priming input P0A of the flip-flop 4D–83 has a positive potential applied to it. When the beginning of block reset pulse appears, the flop-flop 4D–83 is set to its "0" or odd block state.

After the first block has been rerun from memory following a BNOK signal, the next beginning of block reset pulse resets the first rerun block flip-flop 5D–115 to its "0" state in a manner similar to that which occurs at the end of transmission of the first block of the message. When this occurs, the answer-back logic of FIG. 5 once again is rendered responsive to the return signals from the receiver.

In the event that no response is received from the receiver all of the answer-back flip-flops 5A–110 through 5C–113 remain set to their "0" state. When this occurs the outputs of both NOR gates 5A–122 and 5C–125 are positive. These positive potentials after being inverted by the inverters 5B–123 and 5D–124, respectively, cause a negative potential to remain applied to the input of the no response NOR gate 5B–121. The other input to the NOR gate 5B–121 is obtained from the "1" output of the first rerun flip-flop 5D–115 and this potential is negative at this time. As a consequence, the output of a NOR gate 5B–121 is positive and this positive potential is applied to the no response output lead 5B–133. It also is applied to the priming input P1B of the no response flip-flop 5D–109. The priming input P0B of the no response flip-flop 5D–109 and the priming input P1A of the first rerun block flip-flop 5B–115 have a negative potential applied to them since these inputs are derived from the inverted output of the NOR gate 5C–125.

When the next beginning of block reset pulse is applied to lead **5B–92*a*, 4D–92*a*, it has no effect on the first rerun block flip-flop 5D–115; but it causes the no response flip-flop 5D–109 to be set to its "1" state since the reset pulse is applied to the trigger input 1B of the flip-flop. As a consequence, the "1" output of the no response flip-flop 5D–109 rises to a positive potential causing a postive output to be applied to the output lead 5D–134 with this output indicating a delayed no response signal. Since there must always be a response of some kind from the receiving station, operation of the no response flip-flop 5D–109 to its set "1" state indicates either a failure at the receiving station in the return signal generating circuit or a line break or the like on the return signal line from the receiving station to the transmitting station. When this occurs, the transmitting station is not furnished with the necessary information for maintaining block synchronization and the output of the no response flip-flop 5D–109** is utilized to cause the transmitter to continuously send a special error character to the receiving station for the purpose of maintaining bit and character synchronization.

The system will remain in this "no response" state until one of the four possible return signals is detected by the answer-back flip-flops 5A–110 to 5C–113. When one of these return signals is detected, the transmitter rerun control logic then causes rerun of the proper blocks from memory if the return signal is a BNOK signal and causes the system to go into an alarm condition if a BOK signal is received after a "no response" as will be more fully described subsequently. If the first return signal following a "no response" is a BNOK signal, the output of the NOR gate 5C–125 drops to a negative potential. This negative signal is inverted by the inverter 5D–131 causing a priming potential to be applied to the priming input P0B of the no response flip-flop 5D–109 which then is reset to its "0" state by the next beginning of block reset pulse as described previously.

TRANSMITTER RERUN CONTROL LOGIC

Figure 6:
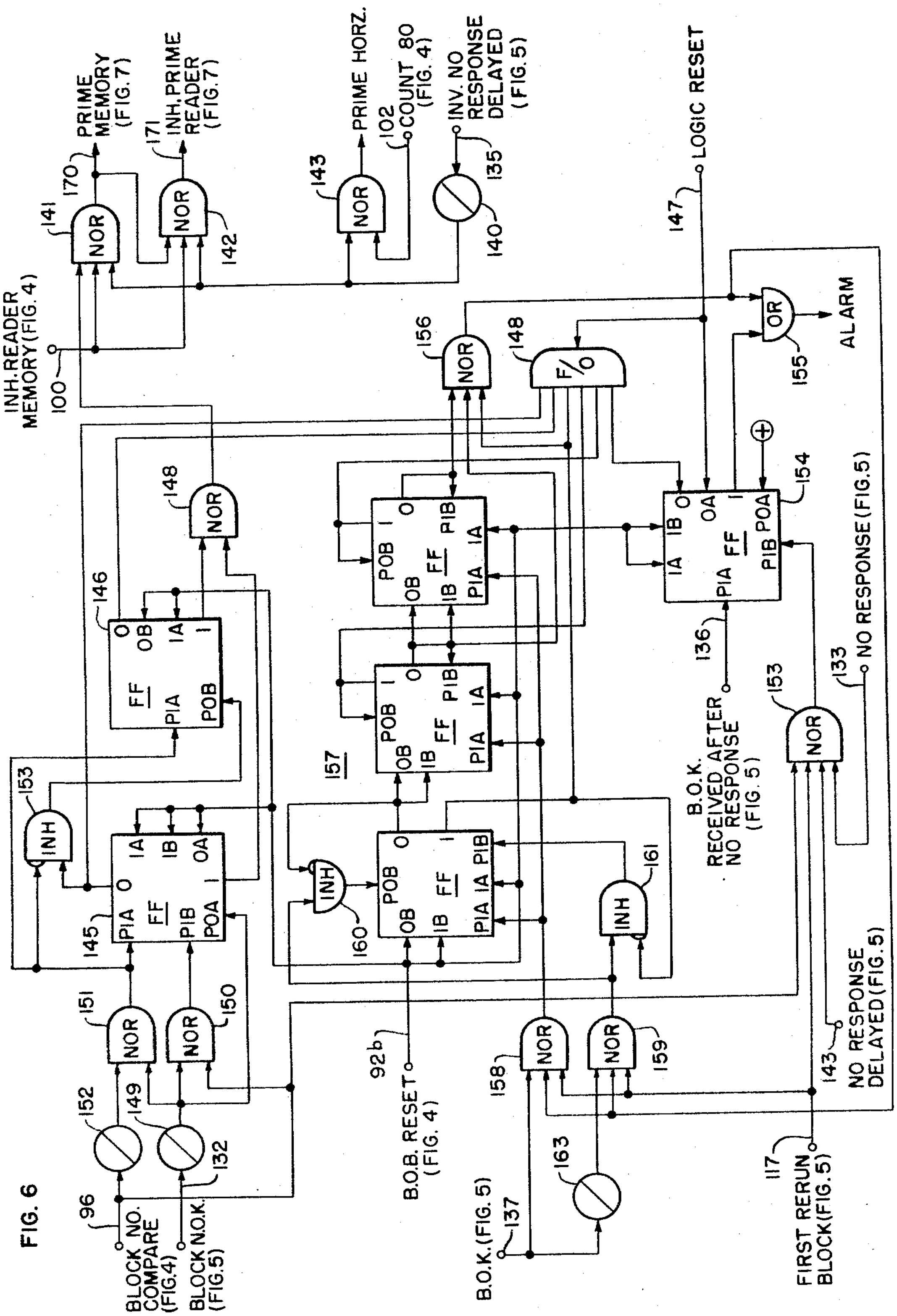

The rerun control logic is shown in FIG. 6 and its primary purpose is to provide the necessary signals to the transmitting station memory to cause rerun of one or two blocks from the memory depending upon the particular return signals received from the receiving station in the event an error or a no-response is detected by the answer-back logic shown in FIG. 5. It should be noted that all decisions are made in the rerun control logic at the time of occurrence of the beginning of block reset pulse applied to the lead **4D–92*b*, 6A–92*b***.

First, assume that normal error free transmission and reception is taking place. In this event, all of the return signals supplied to the transmitting station from the receiving station are BOK signals. During error free transmission the no response flip-flop 5D–109 remains set to its "0" state with a positive potential being applied to the inverted non-response delay lead 5B–135, 6D–135. This positive potential is inverted by an inverter 6D–140 which in turn applies a negative enabling potential to three memory control NOR gates 6B–141, 6B–142, and 6B–143 thereby rendering these gates responsive to signals from other sources.

The output of the NOR gate 6B–141 is utilized to control the operation of the random access memory at the transmitting station during rerun or read-out of information from the memory. The NOR gate 6B–142 is utilized to control the operation of the reader at the transmitter and also is utilized to control the storage of transmitted information in the random access memory during transmission from the reader. The output of the NOR gate 6B–141 is supplied to the input of the NOR gate 6B–142 so that whenever a positive output signal is obtained from the NOR gate 6B–141 the output of the NOR gate 6B–142 is negative and vice-versa.

A second input common to both of the NOR gates 6B–141 and 6B–142 is obtained over the lead 6B–100, 4A–100 from the output of the NOR gate 4A–84 at the transmitting station. During transmission of all but the parity check character, the output of the NOR gate 4A–84 is a negative potential, as has been described previously, enabling both of the NOR gates 5B–141 and 142. When this signal rises to a positive potential during transmission of the 81st or parity check character (count 80 of the counter 4AB–80), the NOR gates 6B–141 and 6B–142 both are disabled causing both of their outputs to drop to a negative potential during the 81st character.

The NOR gate 6B–143 has the inverted output of the NOR gate 4A–84 applied to it over the lead 4A–102, 6B–102. As a consequence, during transmission of the information characters from the reader, a positive potential is applied to the input of the NOR gate 6B–143 causing its output to remain negative during transmission of the block. When count 80 is reached by the counter 4AB–80, however, a negative potential is applied to the input of the NOR gate 5B–143 which provides a positive potential at its output so long as a positive potential is applied to the input lead 6D–135 from the no response flip-flop 5D–109. The positive potential from the output of the NOR gate 6B–143 then may be utilized to cause transmission of the parity check character to the receiving station. Since both of the NOR gates 6B–141 and 6B–142 are disabled at this time, the parity check character is not supplied to the memory for storage at the transmitter and the reader, if transmission is taking place from the reader, is stopped to allow transmission of this parity check character after the block of information characters has been transmitted from the reader. Similarly, if transmission of the block had taken place from the memory, read out from the meory is stopped during transission of the parity check character.

In the event that a BNOK return signal is received by the answer-back logic shown in FIG. 5, the rerun logic of FIG. 6 operates to cause rerun of one or two blocks from memory. The basic rerun control logic is comprised of a pair of flip-flops 6A–145 and 6A–146. Prior to the transmission of any information from the transmitting station, a positive logic reset pulse is applied to a logic reset terminal 6D–147. This pulse is comparable to and is supplied simultaneously with the logic reset pulse applied to the terminals 4A–81 and 5A–108. This logic reset pulse is supplied through a fan-out gate 6D–148 which then causes the flip-flops 5A–145 and 5A–146 to be reset to their "0" states by means of collector reset. When this occurs, a negative potential is obtained from the "1" outputs of both of these flip-flops causing the output of a NOR gate 6B–148 to rise to a positive potential. This positive output is supplied to the input of the NOR gate 6B–141 causing the output of that NOR gate to be at a negative potential which in turn causes the output of the NOR gate 6B–142 to be at a positive potential at the start of transmission and for so long as error-free transmission takes place.

As soon as any BNOK (block errored) return signal is received from the receiving station, a positive potential is applied to the BNOK lead 5B–132, 6A–132, where it is inverted by an inverter 6A–149 to cause a negative potential to be applied to the inputs of a pair of NOR gates 6A–150 and 6A–151. The other input to the NOR gate 6A–150 is obtained from the output of the block number comparison circuit which is applied to the lead 4C–96, 6A–96. The second input to the NOR gate 6A–151 is the block number comparison potential applied to the lead 4C–96, 6A–96 after inversion by an inverter 6A–152.

Since the potential applied to the lead 4C–96, 6A–96 is a positive potential when the received block number and the transmitted block number are different, it is apparent that the NOR gate 6A–151 is enabled when this occurs causing a positive priming potential to be obtained from its output and applied to the priming inputs P1A of the flip-flops 6A–145, 6A–146. At the same time this positive potential at the output of the NOR gate 6A–151 is applied to the inhibit input of an inhibit gate 6A–153 causing the output of that gate to remain at a negative potential. Following this operation, the next beginning of block reset pulse is applied to the lead **4D–92*b*, 6A–92*b* and is applied to the trigger inputs 1A, 1B, 0A of the flip-flop 6A–145 and to the 1A and 0B trigger inputs of the flip-flop 6A–146. As a result, both of these flip-flops are set to their "1" state causing the "1" outputs of both flip-flops to rise to a positive potential. This in turn causes the output of the NOR gate 6B–148 to drop a negative potential thereby enabling the NOR gate 6B–141 causing its output to rise to a positive potential which in turn causes the output of the NOR gate 6B–142 to drop to a negative potential. Since both flip-flops 6A–145 and 6A–146** were set to their "1" state, two blocks will be rerun from memory.

The receipt of a BNOK return signal from the receiving station causes the first rerun block flip-flop 5D–115 to be set to its "1" state by the same beginning of block reset pulse which causes the rerun control flip-flops 6A-145 and 6A–146 to be set to their "1" state. This same beginning of block reset pulse also resets all of the answer-back flip-flops 5A–110 through 5C–113 to their "0" state as has been described previously. During the transmission of the first rerun block, these flip-flops are held in their "0" state by the negative output of the NOR gate 5A–120 which has a positive potential applied to its input from the "1" output of the first rerun block flip-flop 5D–115. As a consequence, the output of the NOR gate 5C–125 has a positive potential during this block causing a negative potential to be applied to the lead 5B–132, 6A–132. This negative potential is inverted by the inverter 6A–149 and appears as a positive potential on the inputs of both NOR gates 6A–150, 6A–151. The potential applied to the priming inputs P1A of the flip-flops 6A–145 and 6A–146 then is negative and the potential applied to the priming input P1B of the flip-flop 6A–145 is negative at this time. The priming potential applied to the priming input P0A of the flip-flop 6A–145 is positive when this occurs, since it is obtained directly from the output of the inverter 6A–149.

Thus, when the next beginning of block reset pulse is applied to the lead **6A–92*b*, 4D–92*b* at the end of the first pulse rerun from the memory, the flip-flop 6A–145 is set to its "0" state. When this occurs, a positive output potential is obtained from the "0" output of the flip-flop 6A–145 and is passed by the inhibit gate 6A–153 since that gate now has a negative potential applied to its inhibit input. This positive potential then is applied to the priming input P0B of the flip-flop 6A–146. It should be noted that the flip-flop 5D–115 is reset to its "0" state at the same time the flip-flop 6A–145** is reset to its "0" state.

After transmission of the second block from the memory, another beginning of block reset pulse is applied to the lead **6A–92*b* and this pulse causes the flip-flop 6A–146 to be set to its "0" state if the return signal is BOK for the previous block. When this occurs, the output of the NOR gate 6B–148 rises to a positive potential thereby causing the output of the NOR gate 6B–141 to drop to a negative potential which in turn causes the output of the NOR gate 6B–142** to rise to a positive potential. When this occurs, normal transmission from the reader and loading of the transmitted information into the memory resumes, and read out of information from the memory ceases as will be more fully described hereinafter.

The foregoing sequence of events is the normal sequence and operation of the rerun control logic for the system when an error is detected at the receiver in any block. This occurs since the transmitter already is transmitting a second block when the return signal indicates that the first block transmitted was in error. The transmitter completes transmitting this second block of information; and at the end of the block, an error is forced in the parity check character for that block causing the second block to be errored also. This is accomplished through the operation of the check character inversion NOR gate 4C–89.

During the transmission of the information characters of a block, the NOR gate 4C–89 is disabled by the application of a positive signal to its input from the output of the inverter 4C–85. During the 80th count of the counter 4AB–80, the output of the inverter 4C–85 drops to a negative potential as has been described previously. Once during each character a negative clock signal of short duration also is applied to the NOR gate 4C–89 over a lead 4C–103. During the transmission of the first block and the first rerun block from memory and during transmission of any subsequent blocks when the return signal is BOK, a positive potential is applied to the NOR gate 4C–89 from lead 4C-126 thereby causing it to be continuously blinded and causing its output to remain at a negative potential. When a BNOK return signal is received by the answer-back logic of FIG. 5 in any block other than the first block or a first rerun block, all of the inputs to the NOR gate 4C–89 are negative during count 80 thereby allowing the clock pulse applied to the NOR gate 4C–89 to cause a short positive pulse to be obtained from the output of the gate. This positive pulse then is utilized to force an error in the parity check character then being transmitted from the transmitting station. This may be accomplished in any desired manner and forms no part of the present invention. As a consequence, it is necessary for the transmitting station to retransmit the last two full blocks transmitted whenever a BNOK (errored block) return signal is received in the normal course of transmission.

If, however, no return signal of any of the four types provided for in the system is supplied to the transmitting station by the receiving station the no-response flip-flop 5D–109 is set to its "1" condition in the manner described previously. When this occurs, a negative potential is applied to the lead 5B–135, 6D–135 thereby causing a positive potential to be applied to each of the memory control NOR gates 6B–141, 6B–142, and the parity check generator control NOR gate 6B–143 causing the outputs of all of these NOR gates to drop to a negative potential where it remains until the no-response flip-flop 5D–109 is reset to its "0" state. As has been described previously, this flip-flop is reset to "0" only when the answer-back logic receives a BNOK signal from the receiving station. Whenever a no response condition is detected by the NOR gate 5B–127, except during the first block and a first rerun block, a positive potential is applied over the lead 5B–133, 6C–133 to the input of a NOR gate 6C–153 causing the output of the NOR gate 6C–153 to drop to a negative potential. When the no response flip-flop 5D–109 is set to its "1" state, it causes a positive potential to be applied to the lead 5D–134, 6C–134 holding the output of the NOR gate 6C–153 at a negative potential. The output of the NOR gate 6C–153 is supplied to the priming input P1B of the answer-back format alarm flip-flop 6D–154. This flip-flop initially is set to its "0" state by the application of a logic reset pulse to the terminal 6D–147. When this occurs, the "1" output of the flip-flop 6D–154 is a negative potential which is applied as one input to an alarm OR gate 6D–155.

As stated previously, a BNOK return signal should be received by the answer-back logic of FIG. 5 following any no-response since a no-response causes an error to be forced in the block being transmitted at the time the no-response was detected. In the event that the first return signal detected after a no-response has been detected is any BOK (block error-free) return signal, a positive output is obtained from the NOR gate 5B–127 since that gate is enabled by the negative potential obtained from the "0" output of the flip-flop 5D–109. This output is applied to an output lead 5B–136, 6C-136 to apply a positive priming potential to the priming input P1A of the format alarm flip-flop 6D–154. When the next beginning of block reset pulse is applied over the lead **6A–92*b* to the trigger inputs 1A and 1B of the flip-flop 6D–154, it causes the flip-flop to be set to its "1" state. When this occurs, the "1" output of the flip-flop 6D–154 rises to a positive potential causing a positive output to be obtained from the OR gate 6D–155**. This output signal is an alarm condition and indicates that the system logic has malfunctioned and may be utilized to shut down the transmitting station.

In the event, however, that a BNOK signal is received following a no-response, the above sequence does not occur since a negative potential then is applied to the priming input P1A of the flip-flop 6D–154. In this case, the block number of the errored block may be either the same as or different from the block number at the transmitter since the block for which the return signal was lost could have been either errored BNOK or error-free BOK. If the block for which the return signal initially was lost was errored, the output of the block number comparison circuit 4C–93 and 4C–94, will indicate that the block numbers are different causing a positive potential to be applied to the lead 6A–96. When this occurs, both flip-flops 6A–145 and 6A–146 are set to their "1" state by the application of the next beginning of block reset pulse, as described previously, and two blocks are rerun from memory.

If, however, the return signal which was lost was a BOK signal, the BNOK return signal will be for the second or last block transmitted since only the second block transmitted by the transmitting station was actually in error. As a result, only this second block need be repeated since the receiving station already has recorded the block for which the return signal was lost. When this occurs, the output of the block number comparison circuit applied to the lead 4C–96, 6A–96 indicates that the block numbers are the same and a negative potential appears on this lead. This negative potential is inverted by the inverter 6A–152 to cause a positive potential to be applied to the NOR gate 6A–151 thereby causing the output of that NOR gate to be negative so that no priming potential is applied to the priming input P1A of the flip-flops 6A–145 and 6A–146 at this time. On the other hand, the NOR gate 6A–150 is enabled at this time and causes a positive priming potential to be applied to the priming input P1B of the flip-flop 6A–145. When the next beginning of block reset pulse is applied to the lead **6A–92*b*, only the flip-flop 6A–145 is set to its "1" state with the flip-flop 6A–146 remaining set to its "0" state. The beginning of block reset pulse which then occurs one block later resets the flip-flop 6A–145 to its "0" state so that the output of the prime memory NOR gate 6B–141** remains at a positive potential for only one block instead of two-block duration which normally occurs when rerun is being made from memory.

Of course as soon as any BNOK return signal is received by the answer-back logic of FIG. 5, the no-response flip-flop 5D–109 is reset to its "0" state upon application of the next beginning of block reset pulse thereby enabling the NOR gates 6C–153 and 6B–141, 6B–142 and 6B–143.

The format alarm flip-flop 6D–154 also causes an alarm condition to be indicated whenever the block number comparison signal applied to the lead 4C–96, 6A–96, indicates that the block numbers are the same, except for the first block following a no response condition or at the end of the first block or a first rerun block. At all other times in normal operation of the system, the block number comparison logic should indicate that the block number of the return signal and the block number of the transmitter block count 4D–83 are different. In the event that the block numbers are found to be the same at any time other than the aforementioned condition, the negative signal applied to the lead 4C–96, 6A–96 enables the NOR gate 6C–153 and causes a positive potential to be obtained from its output. This potential then is applied to the priming input P1B of the format alarm flip-flop 6D–154. This occurs since the signal applied to the first rerun block lead 6C–117 and the signals applied to the no response leads 6C–133 and 6C–134 are negative except when the first block or a first rerun block exists or a no-response condition exists. When the next beginning of block reset pulse is applied to the trigger inputs 1A and 1B of the flip-flop 6D–154, the flip-flop is set to its "1" condition which in turn causes a positive output to be obtained from the alarm OR gate 155 in the manner described previously in conjunction with reception of a BOK signal following a no response. This condition now indicates the transmitter and receiver are out of block synchronization.

In the event that a long line break occurs so that no return signals are detected over a long period of time or in the event that the return signal from the receiving station indicates BNOK for a large number of successive retransmissions, it is desirable to cause the transmitting station to go into an alarm condition and shut down. In order to provide this kind of protection. an excessive rerun counter is furnished; and in the preferred embodiment of this invention it comprises a three-stage binary counter 6AB–157 for counting seven consecutive no-response blocks or seven consecutive BNOK return signals (fourteen blocks).

Initially, each stage of the binary counter 6AB-157 is reset to its "1" state by the application of the logic reset pulse to the terminal 6D–147 which is applied to the counter through the fan-out gate 6D–148. The "1" output of the first stage of the counter 6AB–157 and the "0" outputs of the remaining two stages of the counter are applied to the inputs of a three-input NOR gate 6D–156. Since the "1" output of the first stage of the output is positive at this time the output of the NOR gate 6D–156 is negative.

This negative output is applied to one of the inputs of a pair of three input NOR gates 6C–158 and 6C–159 thereby enabling these gates. The NOR gates 6C–158 and 6C–159 are disabled during the first rerun block by the application of a positive pulse applied to them over the lead 5B–117, 6C–117 during the first rerun block. At all other times, however, the potential on the lead 6C–117 is negative also enabling the NOR gates 6C–158 and 159. The output of the NOR gate 6C–159 is applied to the inputs of a pair of inhibit gates 6A–160 and 6C–161 which allow the output of the NOR gate 6C–159 to be passed whenever a negative potential is applied to their inhibit input. The "0" output of the first stage of the counter 6AB–157 is applied to the inhibit input of the inhibit gate 6A–160 and the "1" output of the first stage of the counter 6AB–157 is applied to the inhibit input of the inhibit gate 6C–161. The output of the NOR gate 6C–158 is applied in parallel to the priming inputs P1A of all three stages of the counter 6AB–157.

So long as BOK signals are received from the receiving station, a negative potential is applied to the lead 5B–137, 6C–137 from the output of the block O.K. NOR gate 5A–122. This negative potential is inverted by an inverter 6C–163 causing a positive potential to be applied to the input of the NOR gate 6C–159. As a consequence, the output of the NOR gate 6C–159 is negative and has no effect on the operation of the counter. At the same time, the negative potential applied to the input of the NOR gate 6C–158 causes it output to rise to a positive potential thereby priming the P1A inputs of all three stages of the counter 6AB–157. Then when the beginning of block reset pulse is applied over the lead 6A–92b to the trigger inputs 1A of all the stages of the counter 6AB–157, all stages are reset to their "1" state.

However, any time that no BOK return signal is received by the answer-back logic, i.e., whenever a BNOK signal or no response condition occurs, the potential on the lead 5B–137, 6C–137 and at the input of the NOR gate 6C–158 is positive causing its output to be negative, and the input to the NOR gate 6C–159 is negative causing its output to be positive. This in turn is applied to the appropriate one of the priming inputs P0B or P1B of the first stage of the counter 5AB–157 through the inhibit gate 5A–160 or 5C–161 enabling the beginning of block reset pulse applied to the 0B and 1B trigger inputs of the input stage of the counter 6AB–157 to cause the counter to advance one step for each pulse so applied.

If a BOK signal is received at any time before seven beginning of block reset pulses are allowed to step the counter, it is reset to its initial set "1" state. If, however, a no response condition persists for a period of seven blocks, the counter upon reaching a count of seven causes a positive output signal to be obtained from the NOR gate 6D–156. This positive signal is passed by the OR gate 6D–155 to cause the system to go into an alarm condition. A similar result occurs after 14 blocks of time when seven consecutive BNOK signals are detected by the answer-back logic. The reason that 14 blocks of time must elapse when an errored block indication persists is that for the first rerun block following a BNOK signal a positive potential is applied to the lead 5B–117, 6C–117 causing the NOR gates 6C–158 and 6C–159 both to have a negative output singal during this first rerun block so that the beginning of block reset pulse which occurs at that time has no effect upon the counter. In all other respects the operation of the counter is the same when a continuous BNOK return signal is detected by the answer-back logic of FIG. 5 as occurs for seven block intervals when no response is detected by the transmitting station.

TRANSMIT MEMORY COMMAND LOGIC

Figure 7:
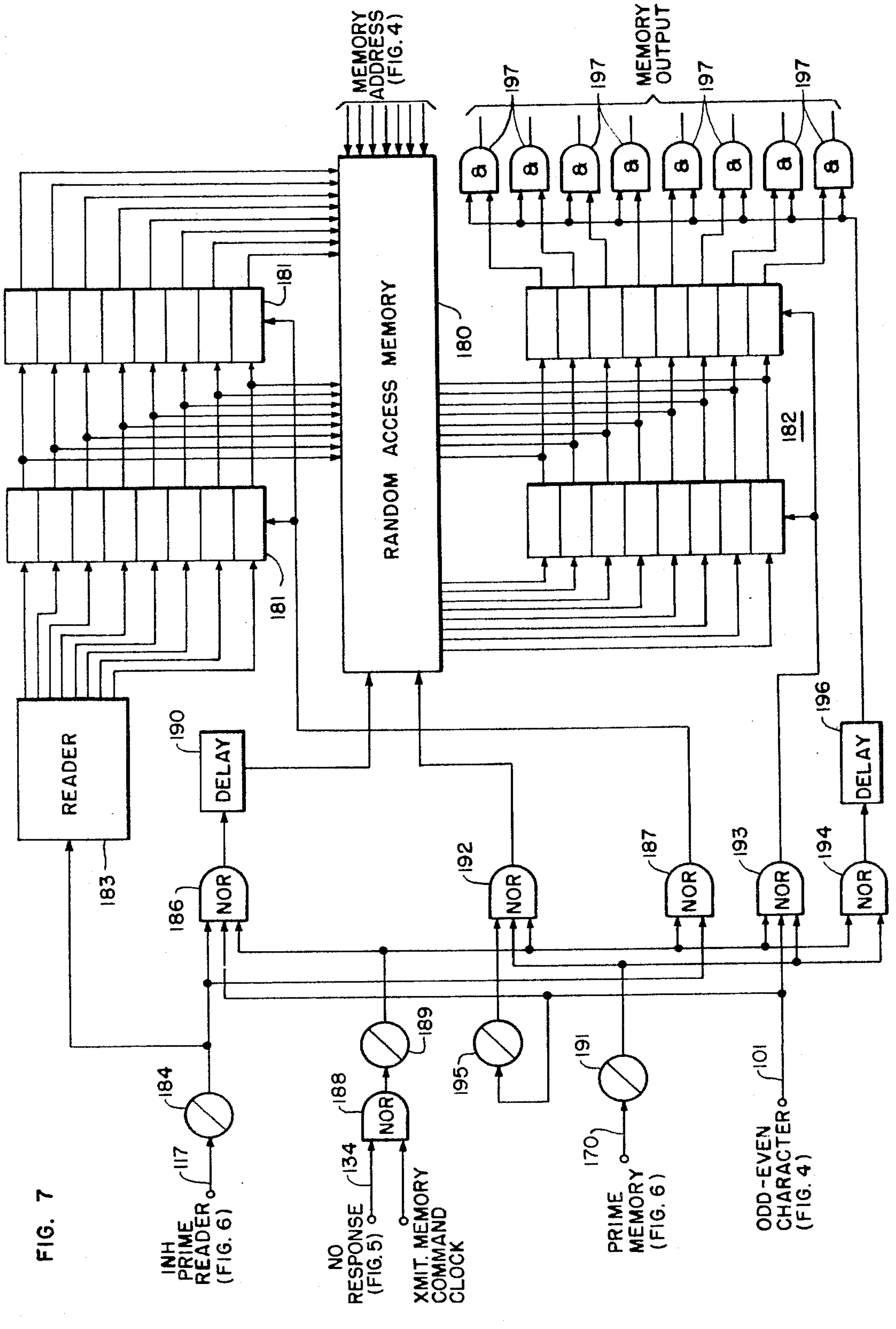

The rerun control logic of FIG. 6 provides the necessary information for operating into and out of the random access memory. FIG. 7 shows in block diagram form a random access memory 7B–180 along with the necesary input and output buffer shift registers 7B–181 and 7D–182, respectively. As stated in conjunction with the description of the transmitter memory logic shown in FIG. 4, the random access memory 7B–180 of a preferred embodiment of this invention has sufficient capacity in each register to store two full characters of information but does not have a sufficient number of addresses to store the two blocks consisting of 160 characters if only one character per address were utilized. As a consequence, the two stage mulltiple level shift register 7B–181 and 7D–182 provide the necessary input and output buffers, respectively, for the memory 7B–180. These multiple level two-stage shift registers may be of the type disclosed in Patent No. 3,147,339 granted in the name of S. Silberg, on Sept. 1, 1964.

The input to the first stage of the input buffer shift register 7B–181 is supplied in parallel from a tape reader 7A–183 which is comparable to the tape reader 24 shown in FIG. 1. The memory address signals obtained from the address counter in FIG. 4 are supplied to the memory in order to cause information to be stored in or read out of the address indicated by the address counter of FIG. 4. The means by which this is done in a random access memory is well known to those skilled in the art, and since the particular operation of the memory forms no part of this invention, details of the memory have not been shown herein.

When normal error-free transmission is taking place from the transmitting station, a negative output signal is obtained from the output of the NOR gate 6B–141 and is applied to the lead 6B–170, 7B–170 and a positive output potential is obtained from the output of the NOR gate 6B–142 and is applied to the output lead 6B–171, 7A–171. The positive potential applied to the lead 7A–171 is inverted by an inverter 7A–184 causing a negative signal to be applied directly to the reader 7A–183. This negative signal enables the reader to run and to read data from a suitable record such as a perforated tape. The negative potential from the output to the inverter 7A–184 also is applied to one of the inputs of a pair of NOR gates 7A–186 and 7C–187. Once for each character, a transmit memory command negative clock pulse is applied to the input of a NOR gate 7A–188, the other input of which is held at a negative potential by the "1" output of the no response flip-flop 5D–109 applied to the lead 5D–134, 7A–134 under all normal conditions of operation. As a consequence, once per character a positive output pulse is obtained from the output of the NOR gate 7A–188, and this pulse is inverted by an inverter 7A–189 which causes a negative pulse of short duration to be applied to the inputs of the NOR gates 7A–186 and 7C–187.

As a consequence, once per character a positive output pulse is obtained from the output of the NOR gate 7C–187 and this pulse is applied as a load input buffer shift pulse to the two stage shift register 7B–181. The first character from the reader 7A–183 is supplied in parallel to the first stage of the shift register 7B–181. Shortly thereafter, the first shift pulse from the output of the NOR gate 7C–187 causes the information from the reader 7A–183 to be stored in the first stage of the shift register 7B–181 and the information previously stored in the first stage to be shifted in parallel into the second stage of the shift register 7B–181. Following this operation, the second character is read by the reader and is supplied in parallel to the first stage of the shift register 7B–181.

At the same time, the "0" output of the odd-even character flip-flop 4A–80*a* is supplied to the odd-even character lead 4A–101, 7C–101 and is applied to the input of the NOR gate 7A–186. The "0" output of the flip-flop 4A–80*a* is positive for odd characters being transmitted and is a negative potential when an even character is being transmitted. Since the first character being read by the reader 7A–183 is an odd character, it coincides with the presence of a positive potential on the lead 7C–101; and this positive potential blocks the passage of the memory command clock pulse by the NOR gate 7A–186. At the time the second command pulses cause the second character supplied by the reader 7A–183 to be stored in the first stage of the shift register 7B–181 and the first character to be stored in the second stage, a negative potential is present on the odd-even character lead 7C–101 thereby enabling the NOR gate 7A–186. Thus the command pulse which caused this second shift pulse to be applied to the shift register 7B–181, also is passed by the NOR gate 7A–186 as a short positive pulse at its output which occurs simultaneously with the application of the shift pulse to the shift register 7B–181. The output pulse obtained from the NOR gate 7A–186, however, is delayed a short time by a delay circuit 7A–190 after which it is applied as the clear/write command to the random access memory 7B–180. The reason for this short delay caused by the delay circuit 7A–190 is to allow the clear/write command to arrive at the memory after the information has been stored in the proper stages of the input buffer shift register 7B–181. At the time the clear/write pulse is applied to the memory 7B–180, the first memory address obtained from the counter 4AB–80 and the block counter flip-flop 4D–83 also is being applied to the memory 7B–180. The information present in the two stages of the input buffer shift register 7B–181 is supplied in parallel to the memory and is stored in the selected address of the memory by the application of the clear/write pulse from the output of the delay circuit 7A–190.

The foregoing sequence is repeated continuously for transmission of the entire block of information characters from the reader 7A–183. It should be noted that a clear/write pulse is applied from the output of the delay circuit 7A–190 to the memory 7B–180 once for every two characters, and that the first of the two characters always is present in the second stage of the input buffer shift register 7B–181 with the second character being present in the first stage of the shift register at the time the clear/write command is given to the memory. It also should be noted at this time that the memory address obtained from the character and block counters of FIG. 4 also changes every two characters, so that the two characters present in the shift register 7B–181 at the time each clear/write pulse is applied to the memory 7B–180 are stored in a single address.

When 80 information characters constituting a block of information have been stored in the random access memory 7B–180, the character counter 4AB–80 has reached a count of 79. As stated previously, at the count of 80, the parity check character is transmitted from the transmitting station. The parity check character is not stored in the memory 7B–180. This is accomplished by the fact that at the 80th count of the counter 4AB–80, the output of the NOR gate 4A–84*a* is positive and this potential is applied over the lead 4A–100 and 6B–100 to cause the outputs of the NOR gates 6B–141, 6B–142 to drop to a negative potential. This negative potential at the output of the NOR gate 6B–142 is inverted, when the system is transmitting from the reader 183, by the inverter 7A–184 which causes a positive potential to be applied to the reader 7A–183 thereby causing the reader to stop. The positive output of the inverter 7A–184 also causes a negative potential to be forced at the outputs of the NOR gates 7A–186 and 7C–187 irrespective of the condition of any of the other inputs to those NOR gates during this one character interval.

As a consequence, no load input buffer shift pulse is applied to the shift register 7B–181 and no clear/write memory command pulse is applied to the memory 7B–180 during the character interval in which the parity check character is being transmitted. Following this one character interval, the system resets as described previously, and resumes normal operation for the next block of information. The potential on the lead 4A–100, 6B–100 drops to a negative potential for the duration of the next block thereby enabling the NOR gates 6B–141 and 6B–142 which in turn allows the above-described sequence of operation to be repeated so long as error-free transmission takes place.

In the event that a BNOK return signal is detected by the answer-back logic of FIG. 5, the output of the NOR gate 6B–148 drops to a negative potential, enabling the NOR gate 6B–141 which causes a positive potential to be applied over its output lead 6B–170, 7C–170 where it is inverted by an inverter 7C–191, the output of which then applies a negative potential to the inputs of three NOR gates 7A–192, 7C–193 and 7C–194 thereby enabling those NOR gates. At the same time the positive potential obtained from the output of the NOR gate 6B–141 causes the output of the NOR gate 6B–142 to be forced to a negative potential which is applied over the lead 6B–171, 7A–171, and is inverted by the inverter 7A–184 as described previously. The inverter 7A–184 then causes a positive potential to be applied to the reader 7A–183 turning it off and to inputs of the NOR gates 7A–186, 7C–187 forcing the outputs of those NOR gates to remain at a negative potential thereby rendering them insensitive to the application of memory command clock pulses for so long as this condition exists.

The transmitting station now is in condition for transmitting information from the random access memory. The odd-even character potentials applied to the lead 4A–101, 7C–101 are applied directly to one input of the NOR gate 7C–193 and are inverted by an inverter 7A–195 which then applies the inverted odd-even potential to one input of the NOR gate 7A–192. The transmit memory command clock pulses which occur once per character are applied in parallel to the input of the NOR gates 7A–192, 7C–193 and 7C–194.

During the first or odd character of the block to be transmitted, a positive potential is applied to the lead 4A–101, 7C–101 in the manner described previously. This positive potential applied to the input of the NOR gate 7C–193 causes that NOR gate to be insensitive to the command clock pulse applied to it during this character. This positive potential, however, is inverted by the inverter 7A–195 causing a negative potential to be applied to the NOR gate 7A–192 during this first character. As a consequence, when the first transmit memory clock pulse is applied to the input of the NOR gate 7A–192, a positive pulse is obtained from the output of that NOR gate and this pulse constitutes the read/restore command to the random access memory 7B–180. The memory address obtained from the character counter 4AB–80 and the block counter 4D–83 is supplied to the memory 7B–180 causing the two characters stored in that address of the memory to be transferred in parallel to the two stages of the output buffer shift register 7D–182, with the first character being transferred into the second or output stage of the shift register 7D–182 and the second character being transferred into the first or input stage of the shift register 7D–182.

Simultaneously, with the application of the read/restore pulse to the random access memory 7B–180, the command clock pulse also is passed by the NOR gate 7C–194, the output of which is a positive sample pulse. This sample pulse is delayed by a delay circuit 7C–196 for a sufficient period of time to allow the information stored in the memory 7B–180 to be transferred into the shift register 7D–182. This delayed sample pulse then is applied to a plurality of AND gates 7D–197, the other input to each of the AND gates 7D–197 being obtained from a corresponding level of the output stage of the shift register 7D–182. Whenever a binary bit of a predetermined type (preferably mark) is present in any given level of the output stage of the shift register 7D–182, a positive potential is obtained from the output of that level and is applied to the corresponding AND gate 7D–197. As a consequence, when the sample pulse is applied to that particular AND gate, a positive output pulse is obtained from the AND gate and this output pulse is utilized by the transmitter distributor 25 shown in FIG. 1 to cause the information to be transmitted from the transmitting station.

When the second character of the block is to be transmitted, the odd-even character counter 4A–80*a* causes a negative potential to be applied over the lead 4A–101, 7C–101 to the input of the NOR gate 7C–193 and causes a positive potential to be obtained from the output of the inverter 7A–195 which applies this positive potential to the input of the NOR gate 7A–192 causing the output of the NOR gate 7A–192 to drop to a negative potential. The next memory command clock pulse then occurs, causing a positive pulse to be obtained from the output of the NOR gate 7C–193. This positive pulse is applied as a shift pulse to the output buffer shift register 7D–182 causing the character stored in the first stage of the shift register to be transferred to the second or output stage of the shift register 7D–182.

Simultaneously, with the occurrence of this shift pulse the NOR gate 7C–194 is enabled causing a positive sample pulse to be obtained from its output. This pulse is delayed by the delay circuit 7C–196 in the manner described previously and is applied to the memory output AND gates 7D–197 causing the second character of the block being retransmitted to be supplied to the transmitter distributor.

This sequence then is repeated for the remainder of the characters of the block being transmitted from the memory with a read/restore pulse being obtained from the output of the NOR gate 7C–192 every other character causing two characters to be stored in the output buffer shift register 7B–182. Following this operation, a sample pulse is applied to the memory output AND gates 7D–197 causing the first of the two characters to be supplied to the transmitter distributor; and following this operation a shift pulse is obtained from the output of the NOR gate 7C–193 at the time of the next character causing the second character of the pair of characters obtained from a single address of a memory to be supplied to the output stage of the output buffer stage 7D–182. Then this second character is sampled by a sample pulse obtained from the output of the delay circuit 7C–196. It should be noted that sample pulses are obtained from the output of the NOR gate 7C–194 once per character and that read/restore pulses are obtained from the output of the NOR gate 7A–192 for every odd character and that shift pulses are obtained from the output of the NOR gate 7C–193 for every even character thereby causing all of the characters to be supplied in the proper sequence to the memory output AND gates 7D–197.

As stated previously, when the 80th count is reached by the character counter 4AB–80, all of the NOR gates 7A–186, 7A–192, 7C–187, 7C–193 and 7C–194 are disabled allowing the parity check character to be transmitted. If only one block is to be rerun from the memory, the potential applied to the lead 5B–170, 7C–170 from the output of the NOR gate 5B–141 drops to a negative potential following transmission of the parity check character causing a positive potential to be obtained from the output of the inverter 7C–191 which in turn forces the output of the NOR gates 7A–192, 7C–193 and 7C–194 to a negative potential thereby disabling the read-out logic associated with the random access memory 7B–180. Simultaneously, with this occurrence, the potential on the lead 5A–171, 7A–171 rises and after being inverted by the inverter 7A–184 causes an enabling negative potential to be applied to the inputs of the NOR gates 7A–186 and 7C–187 and to the reader 7A–183 thereupon enabling the reader and returning the system to its normal transmit mode of operation. If two blocks are to be rerun from the memory as determined by the condition of the rerun control flip-flops 5A–145, 5A–146, the rerun condition exists for two block duration at which time the system returns to its transmit mode of operation in the same manner as described immediately above. Whether one or two blocks are to be rerun from the memory depends upon the particular sequence of operation of the answer-back and rerun logic of FIGS. 4 and 5 which has been discussed in detail previously. It should be noted that the correct memory address is established when the odd-even block counter 4D–83 is forced to correspond to the received block number when the rerun condition is established as discussed previously.

In the event that a no-response condition is detected by the answer-back logic of FIG. 5, a positive potential is obtained from the "1" output of the no-response flip-flop 5D–109 and is applied over the lead 5D–134, 7A–134 to the input of the NOR gate 7A–188 forcing the output of that NOR gate to remain at a negative potential so long as this condition exists. This negative potential is inverted by the inverter 7A–189 which causes a positive potential to be applied to all of the NOR gates 7A–186, 7A–192, 7C–187, 7C–193 and 7C–194 thereby disabling both the read-in and read-out logic associated with the random access memory 7B–180. At the same time, the output of the NOR gate 6B–142 is forced to a negative potential which is applied over the lead 6A–171, 7A–171 where it is inverted by the inverter 7A–184 causing a positive potential to be applied to the reader 7A–183 thereby disabling the reader. The transmitter remains in this mode of operation until a proper return signal is received from the receiving station at which time rerun of one or two blocks from the memory takes place in accordance with the control signals applied to the memory logic from the rerun control logic of FIG. 6.

In summary, it can be seen that the foregoing system operates to maintain block synchronization between the transmitting and receiving station under all conditions of operation including resumption of operation after a no-response condition on the return line from the receiver to the transmitter.

Since other modifications of this block synchronization system varied to fit particular operating conditions will be apparent to those skilled in the art, the invention is not to be considered limited to the embodiment chosen for purposes of disclosure, but covers all changes and modifications which do not constitute departure from the true spirit and scope of the invention.

What is claimed is:

1. A block synchronization circuit for use in an error detection and correction system employing the transmission of information in blocks each having a predetermined number of characters including:

a receiving station;

a transmitting station for transmitting blocks of information to the receiving station;

means at the receiving station for counting blocks on an odd-even basis;

means at the receiving station for providing one output signal when a received block is errored and for providing another output signal when a received block is error-free; and block condition indicating means at the receiving station responsive to the output of the signal providing means and the output of the receiver odd-even block counter means for supplying, after transmission of each block, a return signal to the transmitting station indicating whether a block received was an odd or even block and whether the block was errored or error-free.

2. A circuit according to claim 1 wherein the transmitting station is provided with means for storing at least two blocks of information transmitted to the receiving station; and means responsive to predetermined return signals for causing retransmission of predetermined ones of the stored blocks to the receiver.

3. A circuit according to claim 1 wherein the receiving station has: a buffer storage means for temporarily storing at least one block of information; and means responsive to an output of the signal providing means, indicating that a received block temporarily stored in the buffer storage means is errored, for preventing that errored block from being recorded by the receiving means.

4. A circuit according to claim 1 wherein the receiving station indicating means transmits one of four discrete return signals to the transmitting station following receipt of each block, said discrete return signals indicating even block error-free, even block errored, odd block error-free, and odd block errored, respectively.

5. A circuit according to claim 1 wherein the transmitting station is provided with means for counting blocks on an odd-even basis;

means for storing a predetermined number of blocks of information transmitted to the receiving station; and means responsive to predetermined combinations of the return signals from the receiving station block condition indicating means and the output of the transmitting station block counter for causing retransmission of predetermined ones of the stored blocks.

6. A circuit according to claim 4 wherein the means for causing retransmission samples the signal from the block condition indicating means at the end of each block to ascertain the condition of the previous block as received.

7. A circuit according to claim 6 wherein the transmitting station has means for forcing an error in the block transmitted just prior to the time the retransmission means samples the return signal whenever the return signal indicates an error or whenever no return signal is present at the time the retransmission means samples the return signal.

8. A circuit according to claim 7 wherein the transmitting station has means for energizing an alarm in response to receipt of a block error-free return signal as the first return signal detected following a sample by the retransmission means which detected no return signal.

9. A circuit according to claim 8 wherein the alarm is energized whenever the block number of the return signal is the same as the block number obtained from the odd-even block counter means at the transmitting station except for the block number of the first return signal detected following a no return signal condition.

References Cited

UNITED STATES PATENTS

| | | | |
|---|---|---|---|
| 2,970,189 | 1/1961 | Van Dalen et al. | 340—146.1 |
| 3,001,017 | 9/1961 | Dirks | 340—146.1 |
| 3,245,040 | 4/1966 | Burdett et al. | 340—146.1 X |

MALCOLM A. MORRISON, Primary Examiner

R. STEPHEN DILDINE, Jr., Assistant Examiner